(12) United States Patent
Iwata

(10) Patent No.: US 6,213,073 B1
(45) Date of Patent: Apr. 10, 2001

(54) COVERING STRUCTURE FOR COVERING TIMING MECHANISM AND TIMING MECHANISM CHAMBER STRUCTURE INSIDE COVER COMPRISED IN COVERING STRUCTURE FOR INTERNAL COMBUSTION ENGINE

(75) Inventor: Kazuyuki Iwata, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/244,994

(22) Filed: Feb. 4, 1999

(30) Foreign Application Priority Data

Feb. 10, 1998 (JP) .................................................. 10-028441

(51) Int. Cl.[7] .............................. F16H 7/08; F02B 67/06; F01M 11/02
(52) U.S. Cl. .................................. 123/90.38; 123/90.31; 123/195 C; 123/198 E
(58) Field of Search ............................ 123/90.31, 90.38, 123/195 C, 198 E

(56) References Cited

U.S. PATENT DOCUMENTS

| | | | |
|---|---|---|---|
| 5,010,855 | * 4/1991 | Ogami et al. | 123/90.31 |
| 5,010,859 | * 4/1991 | Ogami et al. | 123/195 C |
| 5,033,421 | * 7/1991 | Shimada et al. | 123/90.27 |
| 5,159,904 | * 11/1992 | Ingold | 123/90.15 |
| 5,216,984 | * 6/1993 | Shimano et al. | 123/41.44 |
| 5,366,418 | * 11/1994 | Fukushima et al. | 474/111 |
| 5,724,930 | * 3/1998 | Sakurai et al. | 123/90.31 |
| 5,873,336 | * 2/1999 | Uchida | 123/90.31 |
| 6,050,236 | * 4/2000 | Sawaki et al. | 123/195 C |

FOREIGN PATENT DOCUMENTS 5-99288 4/1993 (JP) .
7-42571 2/1995 (JP) .

* cited by examiner

Primary Examiner—Wellun Lo
(74) Attorney, Agent, or Firm—Armstrong, Westerman, Hattori, McLeland & Naughton, LLP

(57) ABSTRACT

A hydraulic tensioner for use on an internal combustion engine provided with a timing mechanism including a wrapping connecting member extended in a timing mechanism chamber defined by an end wall of a cylinder block provided with a main gallery opening into the timing mechanism chamber, and a timing mechanism covering structure, to transmit the rotation of a crankshaft to a camshaft. The hydraulic tensioner exerts pressure to the wrapping connecting member in a direction substantially perpendicular to the running direction of the wrapping connecting member. The hydraulic tensioner comprises a shoe held in direct contact with the wrapping connecting member, and a hydraulic tensioning device for biasing the shoe toward the wrapping connecting member. The hydraulic tensioning device is disposed in the timing mechanism chamber so as to cover the open end of the main gallery. The timing mechanism covering structure has a timing mechanism cover provided with a handhole formed at a position corresponding to the hydraulic tensioning device.

9 Claims, 21 Drawing Sheets

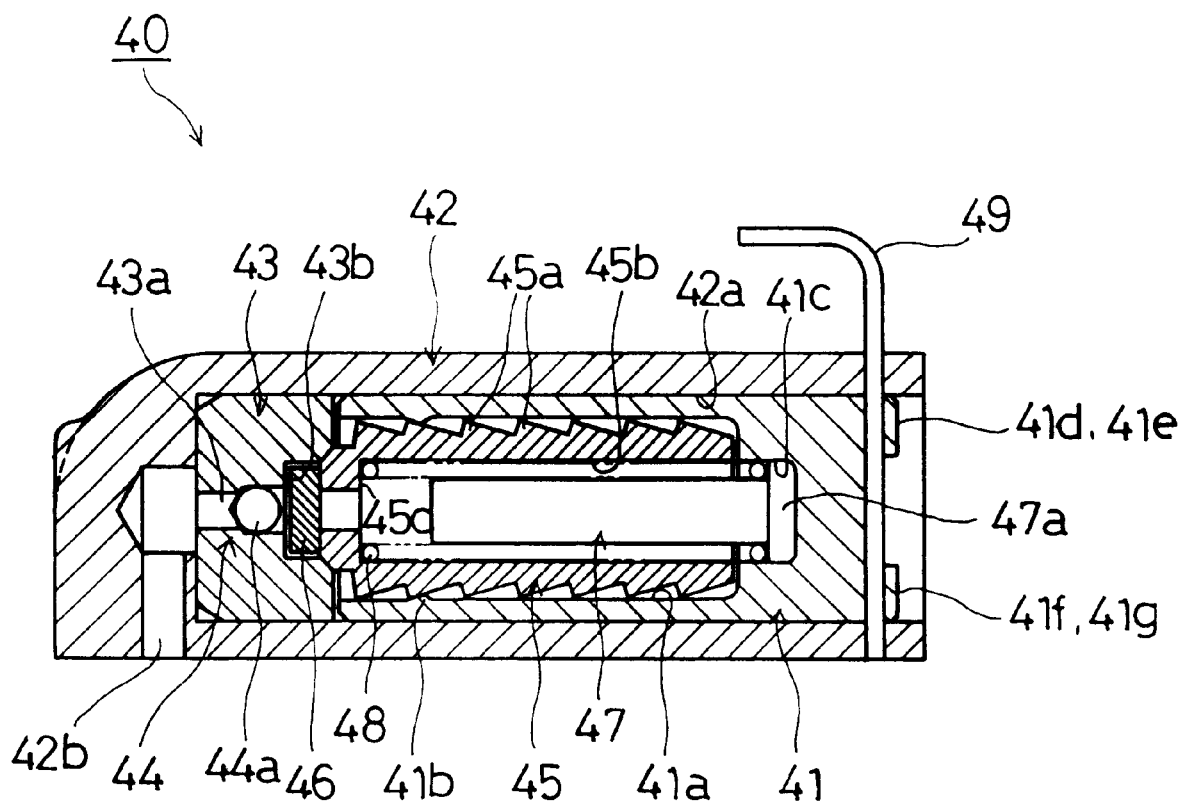
F I G . 7

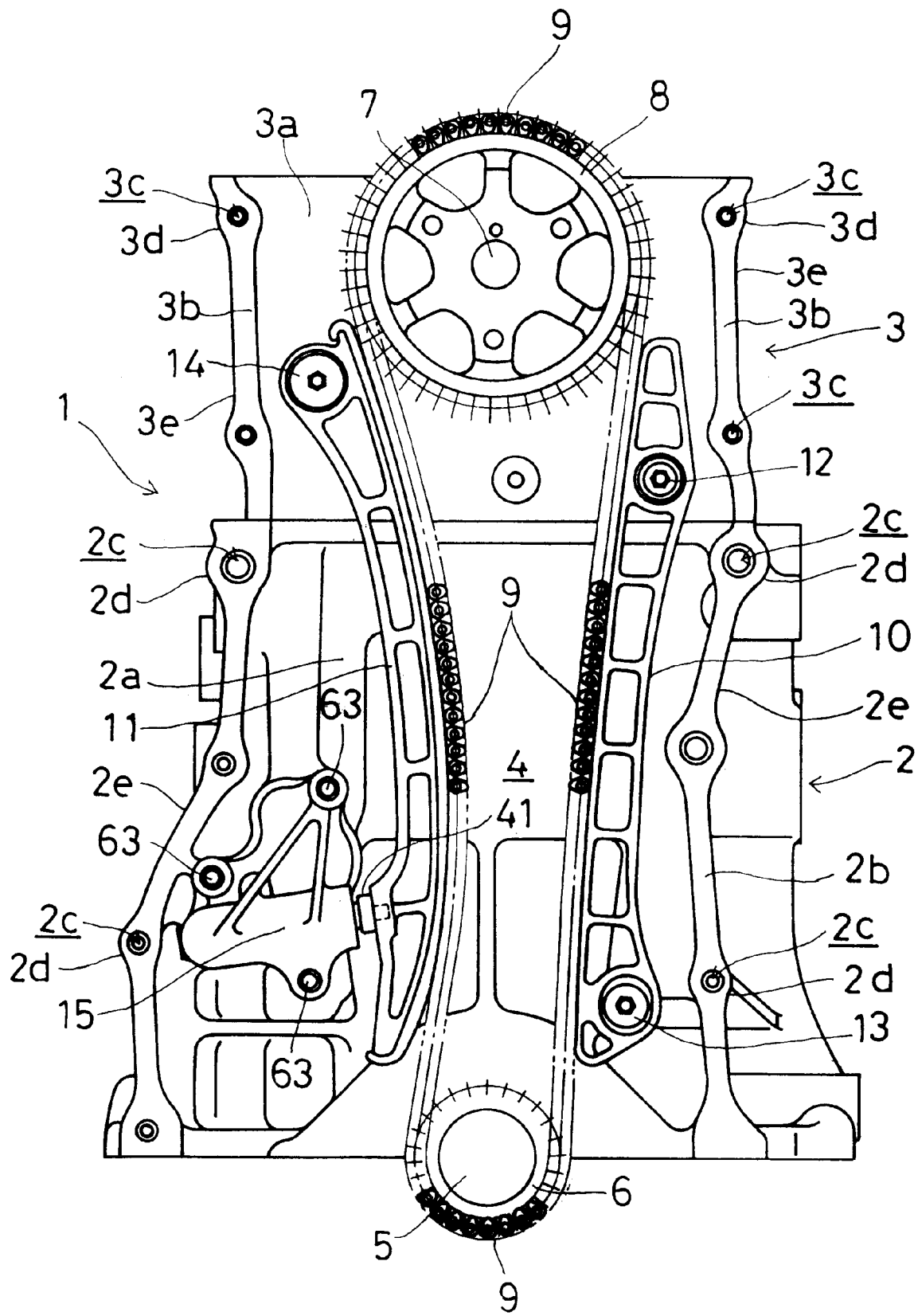
F I G . 12

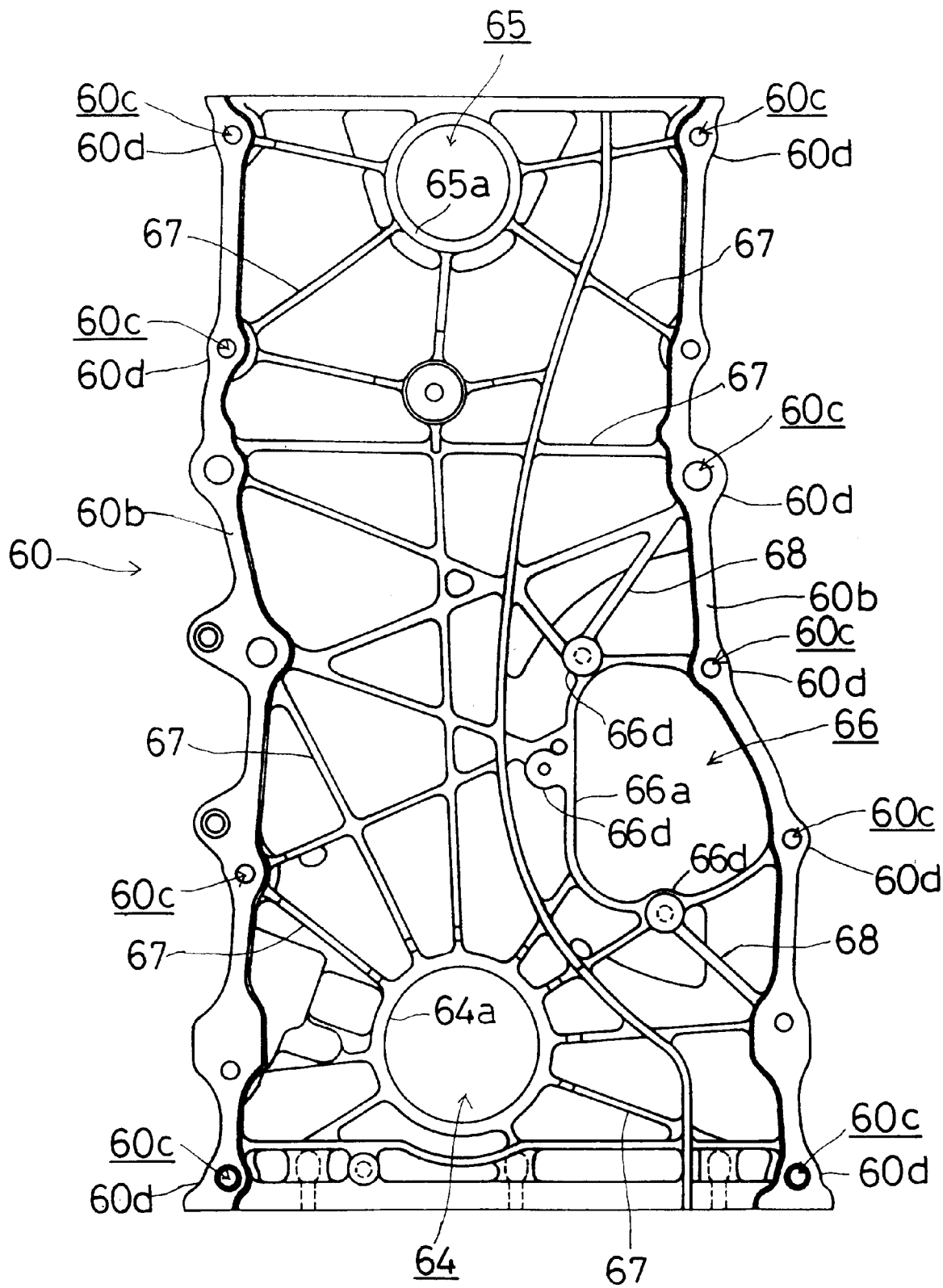
F I G . 15

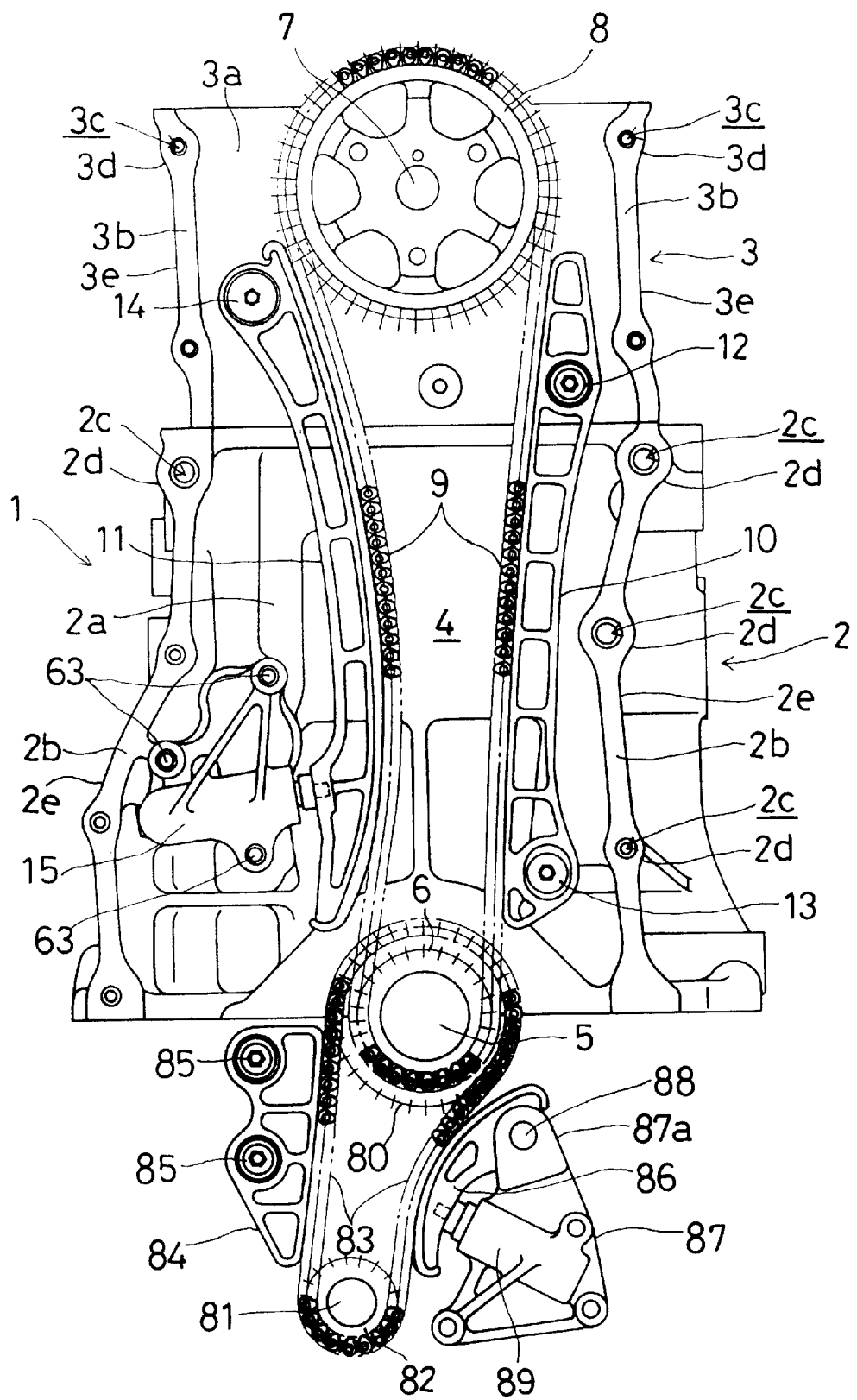
F I G. 19

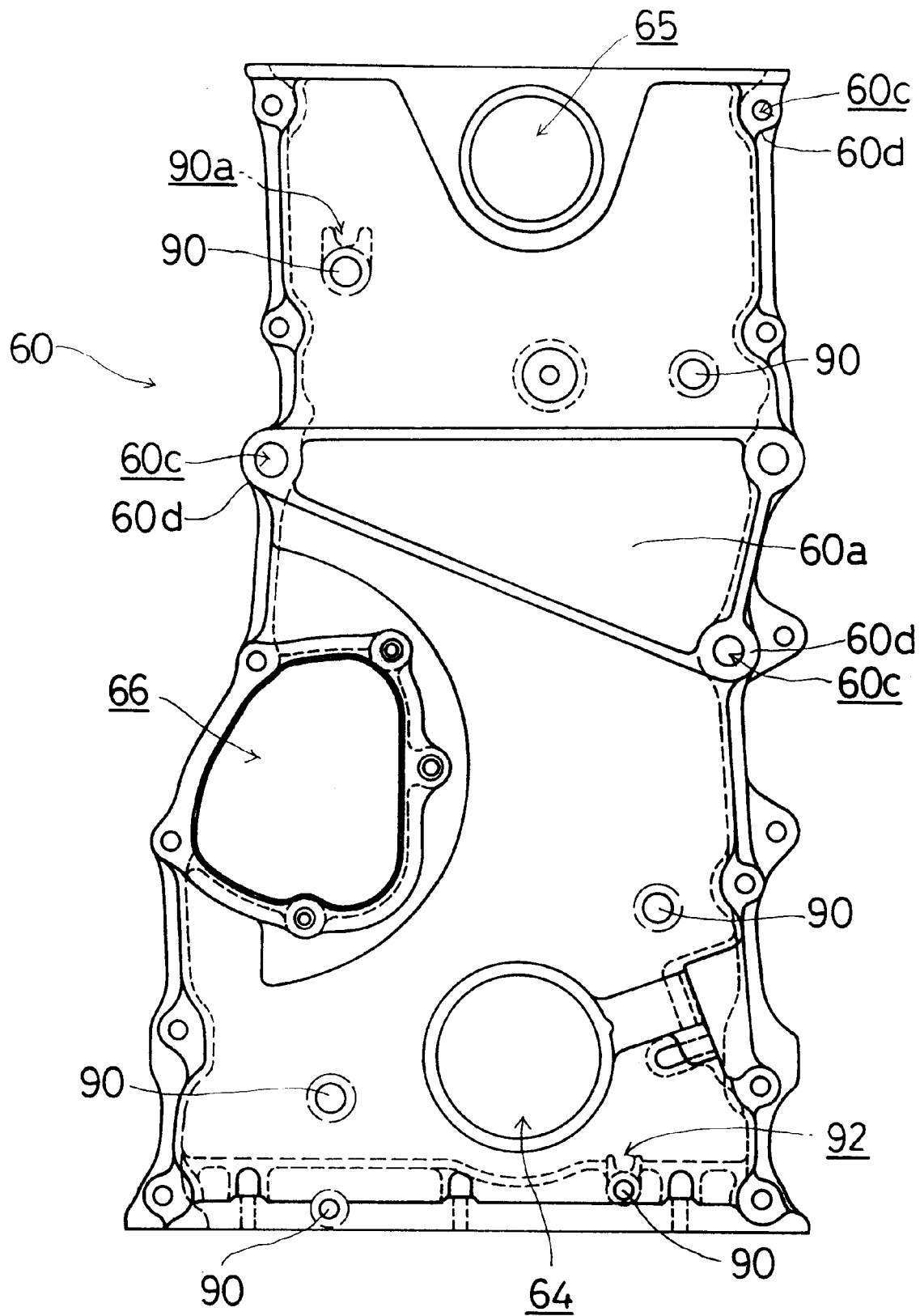
F I G . 20

COVERING STRUCTURE FOR COVERING TIMING MECHANISM AND TIMING MECHANISM CHAMBER STRUCTURE INSIDE COVER COMPRISED IN COVERING STRUCTURE FOR INTERNAL COMBUSTION ENGINE

BACKGROUND OF THE INVENTION

1. Field of the Invention

The present invention relates to a hydraulic tensioner for a timing mechanism included in an internal combustion engine, and a timing mechanism covering structure serving as one of structural members defining a timing mechanism chamber containing a timing mechanism and a lubricating system included in an internal combustion engine. More specifically, the present invention relates to a hydraulic tensioner for a timing mechanism included in an internal combustion engine, having a reduced number of parts, having improved response characteristic and capable of being readily manufactured, and to a timing mechanism covering structure for an internal combustion engine, capable of facilitating maintenance work for the maintenance of a tensioner, of holding the component members of accessories and of preventing support shafts from falling off.

2. Description of the Related Art

As stated in JP-A No. 5-99288, in a conventional internal combustion engine, an open end of the main gallery of the lubricating system of an internal combustion engine on the side of a timing mechanism chamber containing a timing mechanism is stopped with a plug. A tensioning unit included in a hydraulic tensioner for exerting pressure to a timing chain included in a timing mechanism for transmitting the rotation of a crankshaft to a camshaft in a direction substantially perpendicular to the running direction of the timing chain is disposed at a position separate from the main gallery, and working fluid is supplied from the main gallery through a separate oil supply passage to the tensioning unit. Therefore, an additional member, i.e., the plug, is necessary to stop the open end of the main gallery on the side of the timing mechanism chamber, and a wall in which the open end of the main gallery opens must be tapped by a tapping process to close the open end of the main gallery with the plug. Since the tensioning unit is disposed apart from the main gallery, the oil supply passage connecting an oil pump to the tensioning unit is long and it is difficult to raise the working pressure in the tensioning unit quickly immediately after the start of the internal combustion engine. Thus, problems resides in the response characteristic of the tensioner. Since the tensioner is unable to function satisfactorily, the timing chain of the timing mechanism slackens, vibrates and generates noise. Work for forming the long oil supply passage is difficult.

It is difficult to form a narrow bore in a cylinder block owing to the arrangement of an assembly line. Therefore, a pressure regulating constriction cannot be formed and the working fluid of a regulated pressure cannot be supplied to the tensioner.

In an internal combustion engine disclosed in JP-A No. 7-42571, a timing mechanism chamber is formed by covering the respective end walls of a cylinder block and a cylinder head with a timing mechanism cover, and a timing mechanism including a timing chain and a crankshaft sprocket is arranged in the timing mechanism chamber. An end part of the crankshaft penetrates and projects from the timing mechanism cover, and an accessory driving pulley is fixedly mounted on the end part of the crankshaft projecting from the timing mechanism cover. A handhole formed in the timing mechanism cover for the maintenance of an oil pump disposed in the timing mechanism chamber is covered with a cover. The cover is placed on the timing mechanism cover with bolt holes formed therein aligned with threaded holes formed in the timing mechanism cover, and is fastened to the timing mechanism cover with bolts. Since the bolt holes formed in a peripheral part of the cover are concealed behind a crankshaft pulley and an accessory driving belt wound around the crankshaft pulley, the accessory driving belt needs to be removed from the crankshaft pulley and then the crankshaft pulley needs to be removed from the crankshaft before removing the cover for maintenance work, which is very troublesome.

FIG. 24 is a sectional view of a front end part of a V-shape internal combustion engine 01 provided with another prior art timing mechanism cover structure disclosed in JP-A No. 7-42571. Referring to FIG. 24, a chain cover (timing mechanism cover) 03 is fastened to the front end of a cylinder block 02 included in the V-shape internal combustion engine 01 to form a timing mechanism chamber 04. Disposed in the timing mechanism chamber 04 is a timing mechanism comprising a crankshaft sprocket (drive sprocket) 06 mounted on a crankshaft 05, and a chain 07 wound around the crankshaft sprocket 06 and a camshaft sprocket (driven sprocket), not shown, mounted on a camshaft, not shown. The chain 07 extended between the crankshaft sprocket 06 and the camshaft sprocket is wound round a pump sprocket 09 mounted on the shaft of a water pump 010. The rotation of the crankshaft 05 is transmitted through the chain to the camshaft to drive the camshaft for rotation and to the shaft of the water pump 010 to drive the water pump 010.

A pump housing 011 is fastened together with a rear chain cover 012 to the cylinder block 02 with bolts 015. A handhole for maintenance work is formed in a part of the chain cover 03 facing the water pump 010 and is covered with a cover 016. Sometimes, the bolts 015 are caused to become loose by vibrations or the like. It is possible that the bolts 015 loosen greatly when the distance between the heads of the bolts 015 and the cover 016 disposed opposite to the bolts 015 is long as shown in FIG. 24. Consequently, the pump sprocket 09 becomes unsteady, the chain 07 vibrates, and a chain guide and a tensioner arm hit frequently on the chain cover 03 to generate noise. If, by any chance, the bolts 015 should come off the cylinder block 02, the water pump 010 cannot be held in place and would cause serious damage. If the bolts 015 comes off the cylinder block 02 and need to be recovered, the chain cover 03 needs to be removed, and the crankshaft pulley 017 needs to be removed from the crankshaft 05 to remove the chain cover 03, which requires very troublesome work.

If the pivot pin of a tensioner is made of a steel, an arm body is made of an aluminum alloy, and the pivot pin is fitted in a mating hole formed in the arm body in a press fit, the interference between the pivot pin and the arm body tends to decrease at a high temperature due to the difference in coefficient of thermal expansion between the pivot pin and the arm body, and it is possible that the pivot pin comes off the arm body.

SUMMARY OF THE INVENTION

The present invention has been made in view of the foregoing problems in the prior art and it is therefore a first object of the present invention to provide a hydraulic tensioner for an internal combustion engine, not requiring a plug for closing an open end of a main gallery on the side of a timing mechanism chamber, requiring a reduced number of parts, having improved response characteristic and capable of being easily manufactured.

A second object of the present invention is to provide a timing mechanism covering structure for an internal combustion engine, capable of solving the foregoing problems in the conventional timing mechanism covering structure for an internal combustion engine, and of facilitating maintenance work for the maintenance of a tensioner unit disposed in a timing mechanism chamber.

A third object of the present invention is to provide a timing mechanism covering structure for an internal combustion engine, capable of solving the foregoing problems in the conventional timing mechanism covering structure for an internal combustion engine, having a simple construction, and capable of preventing fastening parts, such as bolts and nuts, and support parts, such as pivot pins, for fastening and supporting the component parts of a timing mechanism and those of a lubricating system from coming off.

According to a first aspect of the present invention, a hydraulic tensioner for an internal combustion engine provided with a timing mechanism including a wrapping connecting member for transmitting the rotation of a crankshaft to a camshaft, the wrapping connecting member being extended in a timing mechanism chamber defined by an end wall of a cylinder block provided with a main gallery opening into the timing mechanism chamber, and a timing mechanism covering structure comprises: a shoe held in direct contact with the wrapping connecting member; and a hydraulic tensioning device for biasing the shoe toward the wrapping connecting member to exert pressure on the wrapping connecting member in a direction substantially perpendicular to the running direction of the wrapping connecting member; in which the hydraulic tensioning device is disposed in the timing mechanism chamber so as to cover the open end of the main gallery.

Since the open end of the main gallery is covered with the hydraulic tensioning device, any additional member for closing the open end of the gallery, such as a plug, is not necessary, and a wall in which the open end of the main gallery opens need not be tapped.

Since the hydraulic tensioning device is directly connected to the main gallery, an oil passage between an oil pump and the hydraulic tensioning device is short, the oil passage can easily be formed, and the working pressure of the hydraulic tensioning device can quickly be increased immediately after the start of the internal combustion engine to enable the tensioner to operate in a satisfactory response characteristic. Consequently, the wrapping connecting member, such as a timing chain, will not slacken, vibrate and generate noise.

Preferably, the hydraulic tensioning device has an oil passage provided with a restricting oil passage for pressure regulation. When the tension device is provided with such an oil passage, difficult work for forming a restricting oil passage in an oil passage between the oil pump and the hydraulic tensioning device is unnecessary, and working fluid of a regulated pressure can be supplied to the hydraulic tensioning device. Consequently, the wrapping connecting member can properly be tightened and the timing mechanism is able to operate smoothly.

Preferably, the open end part of the main gallery is enlarged, the enlarged open end part is covered with the hydraulic tensioning device to form a distribution chamber, and the oil passage formed in the hydraulic tensioning device is connected through the distribution chamber to the main gallery.

Since the oil passage of the hydraulic tensioning device is connected through the distribution chamber formed by covering the enlarged end part of the main gallery with the hydraulic tensioning device to the main gallery, an oil passage connected to the oil pump may be formed so as to open into the distribution chamber and such an oil passage can easily be formed. Lubricating oil to be supplied to the functional components of the internal combustion engine including a cam mechanism, and working fluid to be supplied to actuators can temporarily be stored in the distribution chamber and can be distributed from the distribution chamber to parts requiring the lubricating oil and the working fluid. Consequently, pressure loss in the lubricating oil and the working fluid during distribution can be reduced, the lubricating oil and the working fluid can smoothly be supplied, and the oil passage can easily be formed.

Preferably, the oil passage formed in the hydraulic tensioning device is provided with a restricting oil passage for pressure regulation.

When the oil passage formed in the hydraulic tension device is provided with the restricting oil passage, difficult work for forming a restricting oil passage in an oil passage between the oil pump and the hydraulic tensioning device is unnecessary, and working fluid of a regulated pressure can be supplied to the hydraulic tensioning device. Consequently, the wrapping connecting member can properly be tightened and the timing mechanism is able to operate smoothly.

Preferably, a reservoir chamber is formed in a mounting surface of the cylinder block on which the hydraulic tensioning device is mounted, and the oil passage of the hydraulic tensioning device opens into the reservoir chamber.

The oil pumped by an oil pump into the main gallery flows from the distribution chamber through the oil passage provided with the constriction of the hydraulic tensioning device and the reservoir chamber. Therefore, the pressure variation of the oil in the distribution chamber is attenuated by the restricting function of the constriction and the pressure accumulating function of the reservoir chamber. Consequently, the pressure of the oil varies slowly, the oil of the regulated pressure is supplied to the hydraulic actuator of the hydraulic tensioning device, the excessive tightening of the wrapping connecting member can be avoided, and the further smooth power transmitting action of the wrapping connecting member is ensured.

According to a second aspect of the present invention, a timing mechanism covering structure for an internal combustion engine comprises a timing mechanism cover provided with a handhole and defining, together with an end wall of a cylinder block, at least a part of a timing mechanism chamber containing a timing mechanism capable of transmitting the rotation of a crankshaft to a camshaft and comprising a wrapping connecting member and a hydraulic tensioner for tensioning the wrapping connecting member, the tensioner comprising a shoe held in direct contact with the wrapping connecting member, and a hydraulic tensioning device for biasing the shoe toward the wrapping connecting member; and a covering member attached to the timing mechanism cover so as to cover the handhole; in which the handhole is formed in a part of the timing mechanism cover corresponding to the hydraulic tensioning device.

When carrying out maintenance work for the maintenance of the hydraulic tensioning device or replacing work for replacing the hydraulic tensioning device, the covering member is removed by removing fastening members, such as bolts or screws, fastening the covering member to the timing mechanism cover to open the handhole and timing mechanism cover need not be removed, which facilitates maintenance work and replacing work. If the hydraulic tensioning device is detached from the internal combustion engine or the same is displaced to remove pressure from the wrapping connecting member, such as a timing chain or a timing belt, to slacken the wrapping connecting member by operating the hydraulic tensioning device through the handhole, the wrapping connecting member can be disengaged from a camshaft sprocket and the like without removing the timing mechanism cover to carry out maintenance work for maintaining the timing mechanism.

Preferably, the crankshaft has an end part penetrating and projecting from the timing mechanism cover, a crankshaft sprocket or a crankshaft pulley is mounted on the end part of the crankshaft, an accessory driving chain or an accessory driving belt is wound around the crankshaft sprocket or the crankshaft pulley, the covering member has a peripheral part fastened to the timing mechanism cover with the fastening members and not concealed behind the crankshaft sprocket and the accessory driving chain, or the crankshaft pulley and the accessory driving belt.

When carrying out maintenance work for maintaining the hydraulic tensioning device, the fastening members fastening the covering member to the timing mechanism cover can be removed and the handhole can be opened without removing the crankshaft sprocket and the accessory driving chain, or the crankshaft pulley and the accessory driving belt.

Preferably, at least a part of the peripheral part of the covering member fastened to the timing mechanism cover with the fastening members is fastened together with the timing mechanism cover to the cylinder block with a bolt. Thus, the covering member can firmly be fixed and the number of the bolts can be reduced, which is effective in reducing weight and cost.

Preferably, a pivot pin supporting the shoe is disposed near the camshaft, and the hydraulic tensioning device is disposed near the crankshaft.

Generally, the cylinder block is formed so that the width of a part thereof on the side of the crankshaft is greater than that of a part thereof on the side of the camshaft to secure a space for the rotation of the crankshaft. Since the hydraulic tensioning device is disposed in the wider part of the cylinder block on the side of the crankshaft, any additional space for placing the hydraulic tensioning device is not necessary, the shape of the hydraulic tensioning device need not be changed, and the hydraulic tensioning device can be disposed in a compact arrangement.

Preferably, the timing mechanism cover has expanded parts to which the covering member is fastened with bolts, and the expanded parts are connected by ribs to peripheral ribs formed in opposite peripheral parts of the timing mechanism cover, to be fastened to the cylinder block with bolts. The timing mechanism cover has a high rigidity and vibration of the side wall of the timing mechanism cover and noise generation by the timing mechanism cover can be suppressed.

According to a third aspect of the present invention, a timing mechanism covering structure for an internal combustion engine comprising a cylinder block, a cylinder head, a crankcase, a crankshaft, a camshaft, and a power transmitting member for transmitting the rotation of the crankshaft to the camshaft comprises a timing mechanism cover defining, together with a block of at least the cylinder block, the cylinder head or the crankcase, a timing mechanism chamber for housing the power transmitting member, in which a bolt is inserted through a member of an accessory disposed in the timing mechanism chamber and screwed in the block to support the member of the accessory on the block, and the timing mechanism cover is provided on its inner surface with a projection formed at a position corresponding to the bolt so as to project toward the bolt so that the distance between the projection and the head of the bolt is shorter than the length of a part of the bolt screwed into the block.

Since the distance between the projection and the head of the bolt is shorter than the length of a part of the bolt screwed into the block, the projection prevents the bolt from coming off even if the bolt loosens and tends to come off. Thus, the bolt is prevented from coming off and serious damage that may be caused by the fallen bolt can be avoided.

If the member of the accessory is a swing member, the lubricating oil splashed in the timing mechanism chamber collects on the projection, and the bolt can be lubricated by the lubricating oil dripping from the projection. For example, the swing member is a shoe included in a chain tensioner, and the bolt is a pivot pin for pivotally supporting the shoe.

According to a fourth aspect of the present invention, a timing mechanism covering structure for an internal combustion engine comprising a cylinder block, a cylinder head, a crankcase, a crankshaft, a camshaft, and a power transmitting member for transmitting the rotation of the crankshaft to the camshaft comprises a timing mechanism cover defining, together with a block of at least the cylinder block, the cylinder head or the crankcase, a timing mechanism chamber for housing the power transmitting member; in which a support shaft is inserted through a swing member disposed in the timing mechanism chamber to support the swing member on the block, and the timing mechanism cover is provided on its inner surface with a projection formed at a position corresponding to the support shaft so as to project toward the support shaft so that the distance between the projection and the support shaft is shorter than the length of a part of the support shaft in engagement with a support member supporting the swing member.

Since the distance between the projection and the nut is shorter than the length of a part of the nut in engagement with the threaded rod, the nut screwed on the threaded rod to fasten the auxiliary member to the block runs against the projection and is unable to come off the threaded rod. Thus, the falling-out of the nut can surely be prevented by a simple structure.

According to a fifth aspect of the present invention, timing mechanism covering structure for an internal combustion engine comprising a cylinder block, a cylinder head, a crankcase, a crankshaft, a camshaft, and a power transmitting member for transmitting the rotation of the crankshaft to the camshaft comprises: a timing mechanism cover defining, together with a block of at least the cylinder block, the cylinder head or the crankcase, a timing mechanism chamber for housing the power transmitting member; in which a support shaft is inserted through a swing member disposed in the timing mechanism chamber to support the swing member on the block, and the timing mechanism cover is provided on its inner surface with a projection formed at a position corresponding to the support shaft so as to project toward the support shaft so that the distance between the projection and the support shaft is shorter than the length of a part of the support shaft in engagement with a support member supporting the swing member.

Since the distance between the projection and the free end of the support shaft is shorter than the length of a part of the support shaft in engagement with the support member, the support shaft supporting the swing member runs against the projection and is unable to come off the swing member. Thus, the falling-out of the support member can surely be prevented by a simple structure.

The lubricating oil splashed in the timing mechanism chamber collects on the projections formed close to the support shaft, and the support shaft can be lubricated by the lubricating oil dripping from the projection. Thus, the swing member is able to swing smoothly. For example, the swing member is a shoe included in a chain tensioner, and the support shaft is a pivot pin for pivotally supporting the shoe.

Preferably, the projection is provided with a recess opening upward and toward the support shaft. The splashed lubricating oil collects in the recess and the lubricating oil drips from the recess onto the support shaft for further effective lubrication.

BRIEF DESCRIPTION OF THE DRAWINGS

The above and other objects, features and advantages of the present invention will become more apparent from the following description taken in connection with the accompanying drawings, in which:

FIG. 7 is a sectional view taken on line VII—VII in FIG. 3;

FIG. 12 is a schematic side elevation of the internal combustion engine shown in FIG. 11 with a crankshaft pulley and a timing mechanism cover removed;

FIG. 15 is a rear elevation of the timing mechanism cover shown in FIG. 14;

FIG. 19 is a side elevation similar to FIG. 18 with a timing mechanism cover included in the timing mechanism covering structure shown in FIG. 18 removed;

FIG. 20 is a front elevation of the timing mechanism cover included in the timing mechanism covering structure shown in FIG. 18;

DESCRIPTION OF THE PREFERRED EMBODIMENTS

First Embodiment

Figure 1:
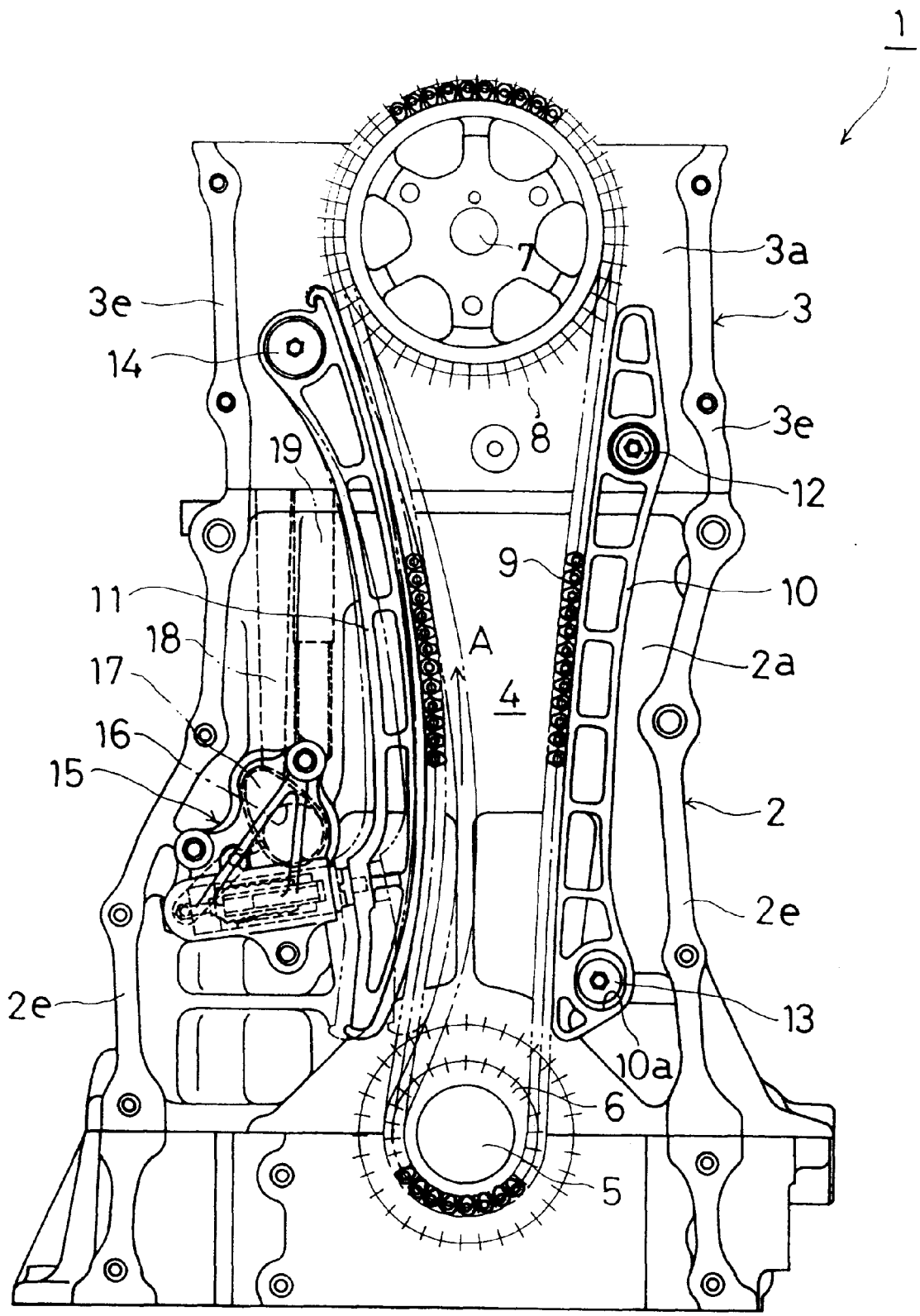
FIG. 1 is a schematic side elevation of an internal combustion engine provided with a hydraulic tensioner in a first embodiment according to the present invention, with a timing mechanism cover removed.

A hydraulic tensioner in a first embodiment according to the present invention will be described with reference to FIGS. 1 to 9. Referring to FIG. 1, an internal combustion engine 1 provided with the hydraulic tensioner in the first embodiment has a timing mechanism chamber 4 defined by an end wall 2a of a cylinder block 2, an end wall 3a of a cylinder head 3, and a timing mechanism cover, not shown. The end wall 2a of the cylinder block 2 has opposite peripheral ribs 2e rising from the surface of opposite sides of the end wall 2a in a small height. The end wall 3a of the cylinder head 3 has opposite peripheral ribs 3e rising from the surface of the opposite sides of the end wall 3a in a small height. A timing chain 9, i.e., a wrapping connecting member, is extended in the timing mechanism chamber 4 between a drive sprocket 6 fixedly mounted on a crankshaft 5 and a driven sprocket 8 fixedly mounted on a camshaft 7. The cylinder head 3 may be formed integrally with the cylinder block 2. The timing chain 9 turns in the direction of the arrow A shown in FIG. 1 to drive the camshaft 7 for rotation at a rotating speed equal to ½ of the rotating speed of the crankshaft 5. Consequently, the camshaft 7 drives a suction valve and an exhaust valve for one operating cycle for two full rotations of the crankshaft 5, namely, one operating cycle of the internal combustion engine 1.

A tight side of the timing chain 9, i.e., a right-hand side as viewed in FIG. 1, pulled taut by the drive sprocket 6 is guided by a guide member 10 made of a resin. A shoe 11 made of a resin is pressed against a loose side of the timing chain 9, i.e., a left-hand side as viewed in FIG. 1, pulled by the driven sprocket 8 to tension the timing chain 9 properly so that the loose side of the timing chain 9 may not vibrate and may not generate noise.

The elongate guide member 10 has an upper end part fastened with an upper bolt 12 to the end wall 3a of the cylinder head 3 and a lower end part fastened with a lower bolt 13 to the end wall 2a of the cylinder block 2. The lower end part of the guide member 10 is provided with an elongate bolt hole 10a for receiving the lower bolt 13 therethrough to enable the lower end part of the guide member 10 to move relative to the lower bolt 13 when the guide member 10 is heated for thermal expansion or cooled for thermal contraction.

The elongate shoe 11 has an upper end part pivotally supported by a pivot pin 14 on the end wall 3a of the cylinder head 3 and a lower end part connected to a hydraulic tensioning device 15. The hydraulic tensioning device 15 pushes the shoe 11 toward the loose side of the timing chain 9 so that the entire length of the guide surface of the shoe 11 presses the loose side of the timing chain 9 in a direction substantially perpendicular to the running direction of the loose side of the timing chain 9 to tension the loose side of the timing chain 9 properly. The shoe 11 and the hydraulic tensioning device 15 constitute a tensioner.

Figure 2:
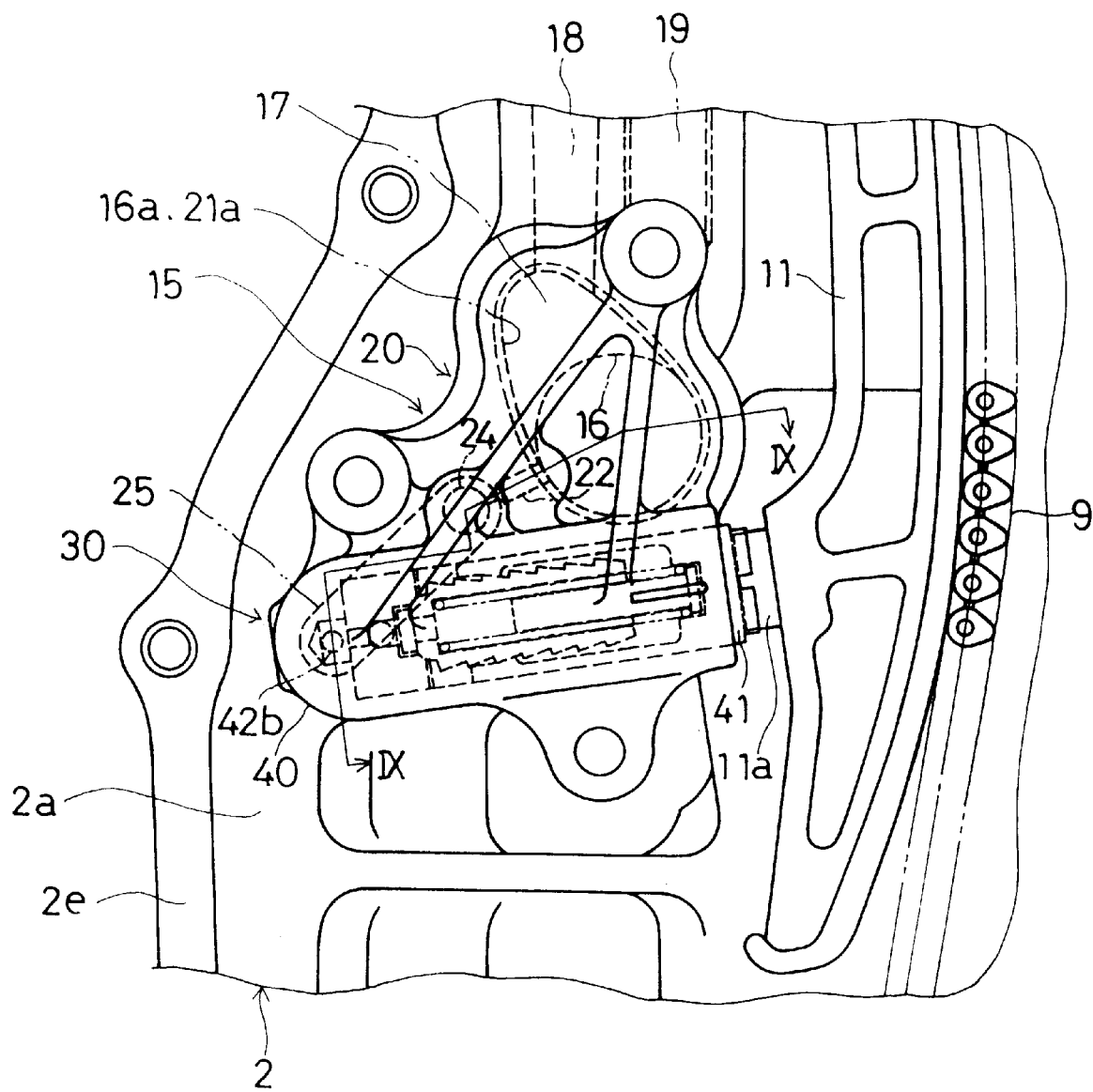
FIG. 2 is an enlarged side elevation of an essential part of the hydraulic tensioner shown in FIG. 1.

As best shown in FIG. 2, a main gallery 16, i.e., a main oil passage of a lubricating system, has a substantially oval expanded open end 16a of about 1 cm in depth formed in a middle part of a left-hand section of the end wall 2a of the cylinder block 2. In FIGS. 1 and 2, the main gallery 16 and the expanded open end 16a are indicated by broken lines. The hydraulic tensioning device 15 covers the expanded open end 16a of the main gallery 16 to form a distribution chamber 17 serving as a reservoir for lubricating oil. The lubricating oil flows from the distribution chamber 17 through an oil passage 18 toward the cylinder head 3 to lubricate rotational sliding parts of the camshaft 7. The lubricating oil is supplied as a working fluid to an actuating unit 40 of the hydraulic tensioning device 15 to drive a plunger 41 included in the actuating unit 40. The cylinder head 3 is fastened to the cylinder block 2 with bolts 19.

Figure 3:
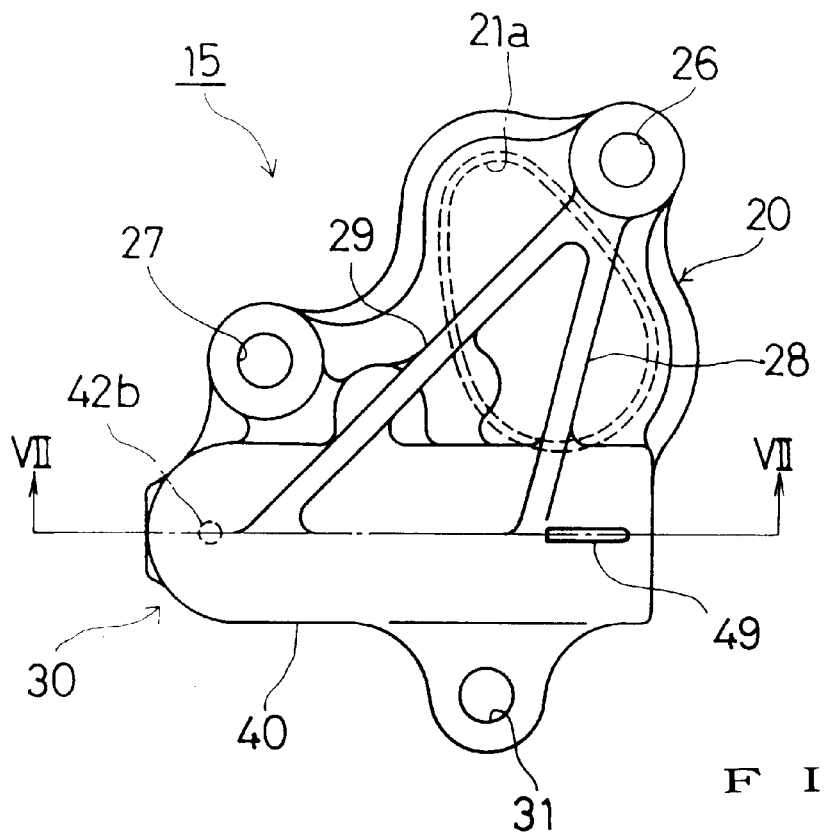
FIG. 3 is a plan view of a hydraulic tensioning device included in the hydraulic tensioner shown in FIG. 1.
Figure 4:
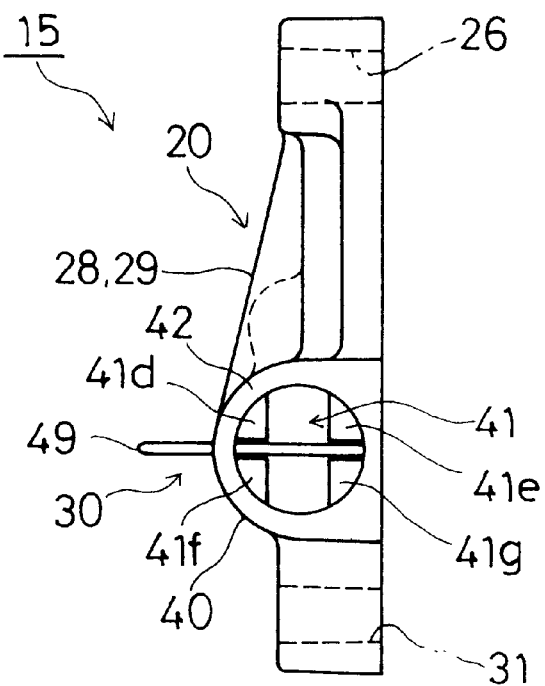
FIG. 4 is a side elevation of the hydraulic tensioning device shown in FIG. 3.
Figure 5:
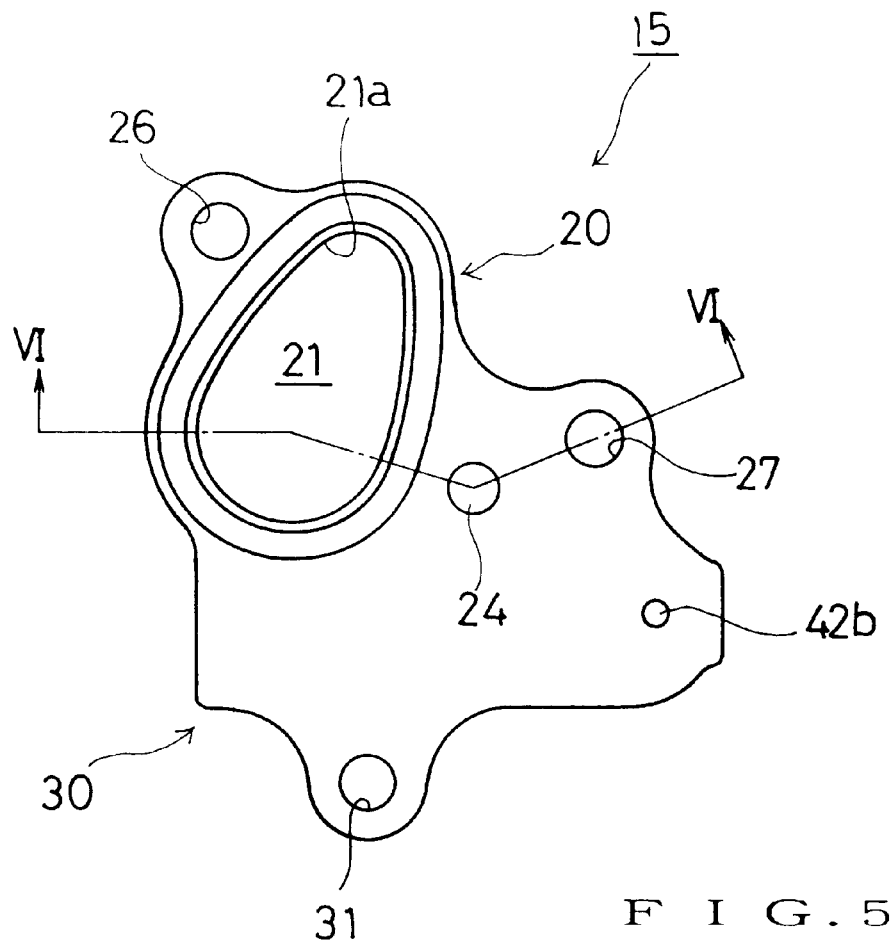
FIG. 5 is a rear elevation of the hydraulic tensioning device shown in FIG. 3.
Figure 6:
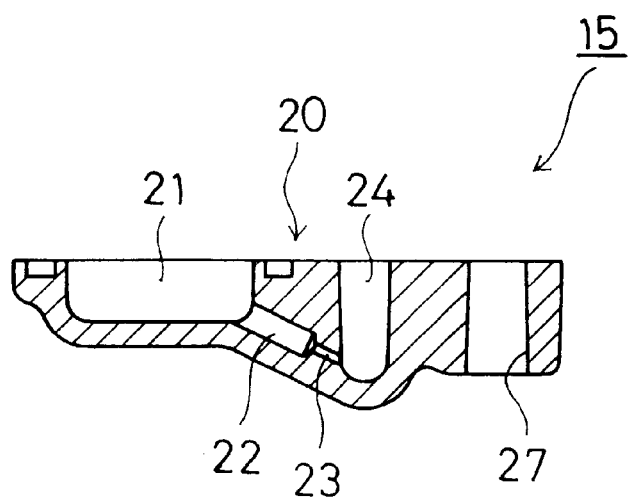
FIG. 6 is a sectional view taken in line VI—VI in FIG. 5.

The construction of the hydraulic tensioning device 15 will be described with reference to FIGS. 2 to 9. The hydraulic tensioning device 15 has a block integrally having an upper half block 20 and a lower half block 30. As shown in FIGS. 4, 6 and 9, the block of the hydraulic tensioning device 15 has a flat back surface in contact with the surface of the end wall 2a of the cylinder block 2. As shown in FIG. 5, the upper half block 20 is provided with a recess 21 having an open end 21a of an oval shape corresponding to the expanded open end 16a of the main gallery 16 formed in the end wall 2a of the cylinder block 2. The distribution chamber 17 is formed by combining the expanded open end 16a and the open end 21a.

The actuating unit 40 including the plunger 41 as shown in FIG. 7 is constructed in the lower half block 30. As shown in FIGS. 2 and 3, the actuating unit 40 has an axis inclined at an acute angle slightly smaller than 90° to the axis of the oval open end 21a of the recess 21. As shown in FIGS. 4 and 7, the lower half block 30 has a semicylindrical part 42 provided with a bore 42a. The plunger 41 is fitted in the bore 42a. An oil passage 42b is formed in a left end part, as viewed in FIG. 7, of the semicylindrical part 42. The oil passage 42b has one end opening into the bore 42a and the other end opening in the flat back surface of the lower half block 30 in contact with the end wall 2a of the cylinder block 2. A short, cylindrical valve member 43 provided with an oil passage 43a is fitted in a bottom part of the bore 42a so that the oil passage 43a is connected to the oil passage 42b. A ball 44a is placed in the oil passage 43a of the valve member 43 to form a check valve 44 to allow the lubricating oil to flow through the oil passages 42b and 43a and the check valve 44 into the bore 42a.

As shown in FIG. 7, the plunger 41 has a closed front end, i.e., a right-hand end as viewed in FIG. 7, an open back end, i.e., a left-hand end as viewed in FIG. 7, and a bore 41a. A ratchet member 45 provided with circular serrations 45a on its outer surface is fitted in the bore 41a of the plunger 41. One of the circular serrations 45a engages with a circular ridge 41b formed on the wall of the bore 41a of the plunger 41 to restrain the ratchet member 45 from axial movement relative to the plunger 41 toward the open end of the plunger 41. The ratchet member 45 is made of an abrasion-resistant hard resin and a bore 45b having a reduced part in its left-hand part, as viewed in FIG. 7, is formed through the ratchet member 45. The reduced part of the bore 45b of the ratchet member 45 communicates with the outlet of the check valve 44. The ratchet member 45 is biased toward the valve member 43 by a compression coil spring 48 so as to be seated on a bevel formed around the outlet of the check valve 44. A retaining disk 46 for retaining the ball 44a in the oil passage 43a is disposed between the left end of the ratchet member 45 and the check valve 44. The retaining disk 46 is held in a counterbore 43b formed in the rim of the outlet of the check valve 44. A recess 41c of a diameter smaller than that of the bore 41a is formed in the inner surface of the end wall of the plunger 41 at the right-hand end, as viewed in FIG. 7, of the plunger 41. A head 47a of a spring holding member 47 is received in the recess 41c. The compression coil spring 48 is compressed between the head 47a and a step 45c formed at the left end, as viewed in FIG. 7, of the bore 45b of the ratchet member 45 to bias the ratchet member 45 toward the open end of the plunger 41. The step 45c is formed at the left end of the bore 45b.

Figure 8:
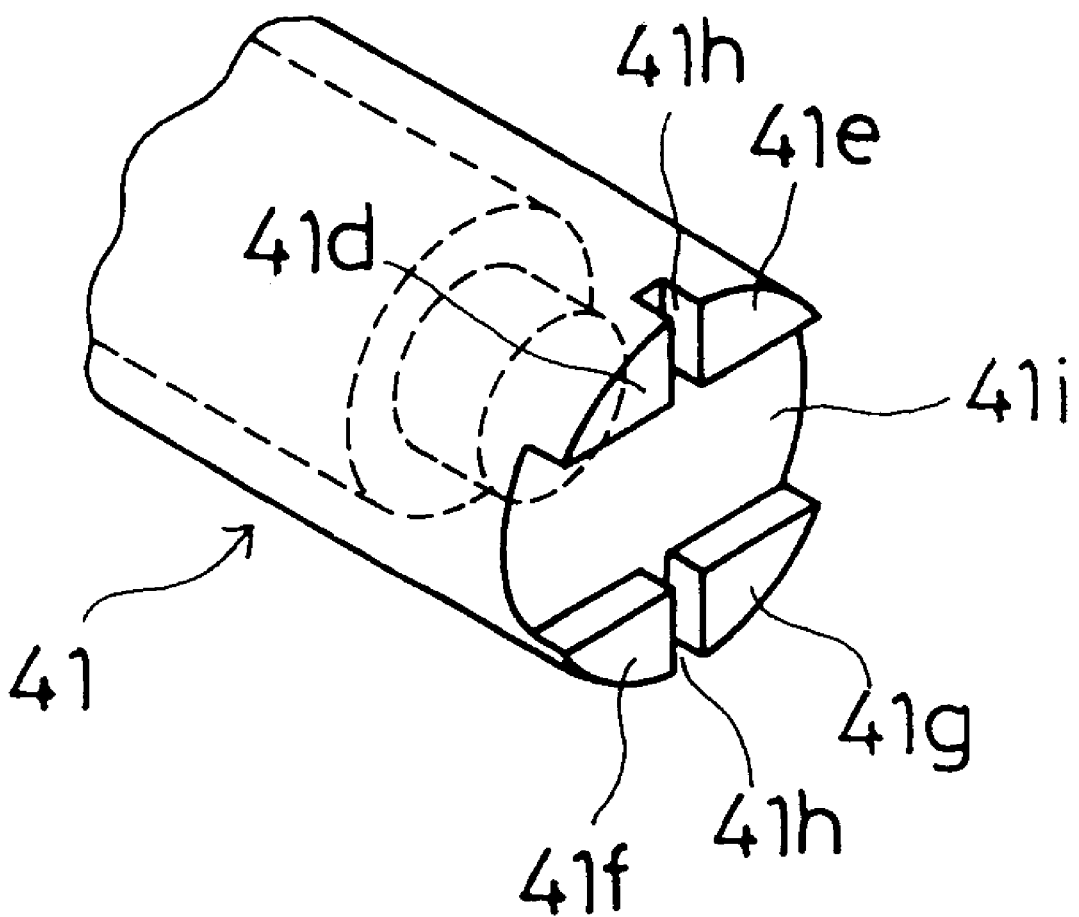
FIG. 8 is a perspective view of a head part of a plunger shown in FIG. 1.
Figure 9:
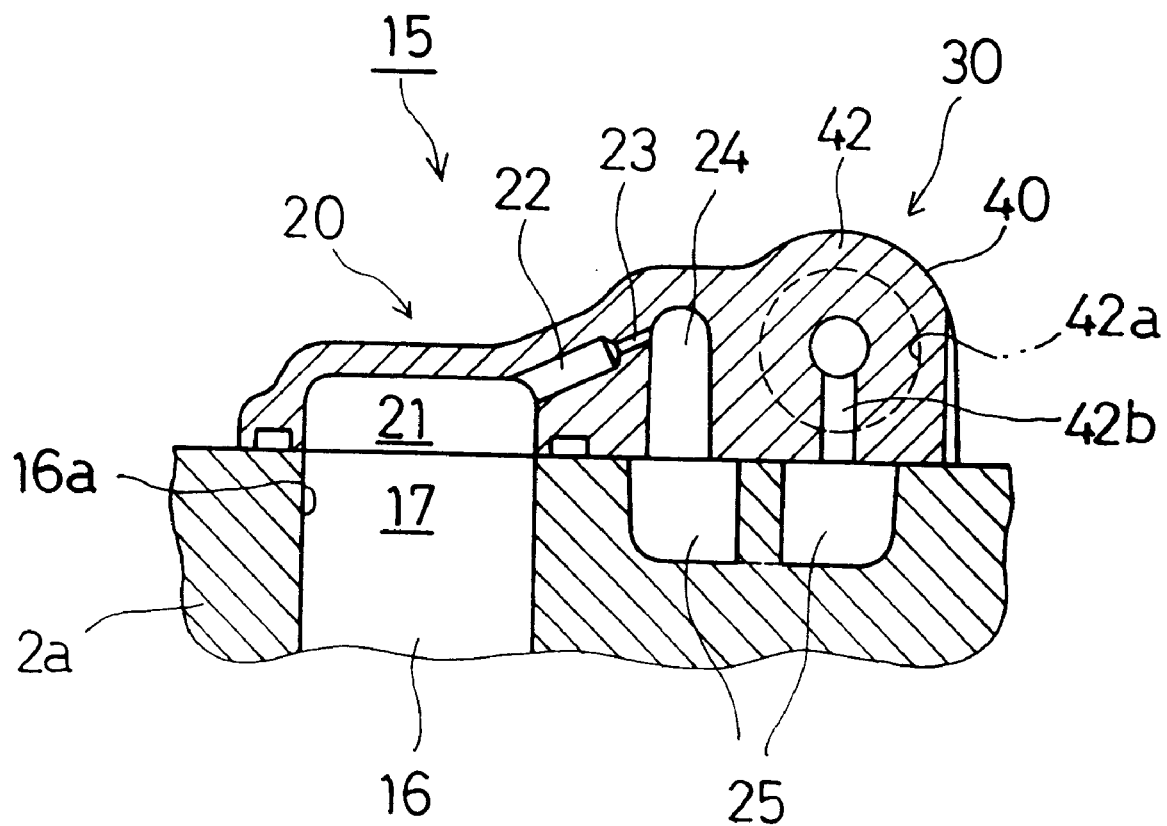
FIG. 9 is a sectional view taken on line IX—IX in FIG. 2.

As best shown in FIG. 8, four projections 41d, 41e, 41f and 41g are formed on the right end, as viewed in FIG. 7, of the plunger 41 The projections 41d, 41e, 41f and 41g are separated from each other by a narrow vertical groove 41h and a wide horizontal groove 41i, and have outer surfaces merging into the outer surface of the plunger 41. When the hydraulic tensioning device 15 is actuated, the plunger 41 is moved axially in the bore 42a and projects from the semicylindrical part 42 of the lower half block 30 to receive a contact part 11a formed on the shoe 11 in the wide horizontal groove 41i. The plunger 41 pushes the contact part 11a to the right, as viewed in FIGS. 1 and 2, to tension the loose side of the timing chain 9. Thus, the vibration of the loose side of the timing chain 9 and the generation of noise by the vibration of the loose side of the timing chain 9 can be prevented. When the hydraulic tensioning device 15 is assembled, an L-shaped pin 49 is inserted into holes formed in the semicylindrical part 42. The pin 49 is in contact with the bottom surface of the narrow vertical groove 41h to hold the plunger 41 at an inmost position. The pin 49 is pulled out after the hydraulic tensioning device 15 has been attached to the internal combustion engine 1.

When the internal combustion engine 1 operates, the lubricating oil is supplied through the main gallery 16, the oil passage 42b of the semicylindrical part 42, the oil passage 43a of the valve member 43, the check valve 44 and a space surrounding the retaining disk 46 into the bore 45b of the ratchet member 45. The plunger 41 is pushed by the pressure of the lubricating oil supplied into the bore 45b of the ratchet member 45 so as to project from the semicylindrical part 42 toward the shoe 11. Consequently, pressure is exerted on the loose side of the timing chain 9 in a direction substantially perpendicular to the running direction of the loose side of the timing chain 9 to tension the loose side of the timing chain 9. If the loose side of the timing chain 9 is slack, resistance against the movement of the plunger 41 toward the shoe 11 is low. Then, the plunger 41 pushes the loose side of the timing chain 9 further to increase the tension of the loose side of the timing chain 9. Consequently, the circular ridge 41b of the plunger 41 separates from the circular serration 45a and comes into engagement with the next circular serrations 45a on the right-hand side, as viewed in FIG. 7, of the circular serration 45a from which the circular ridge 41b has separated.

The lubricating oil for operating the hydraulic tensioner is supplied through the main gallery 16 into the oil passage 42b of the semicylindrical part 42. As shown in FIGS. 2, 5, 6 and 9, the upper half block 20 of the hydraulic tensioning device 15 is provided with an oil passage 22 connected to the recess 21, a restricting oil passage 23 continuous with the oil passage 22, and an oil passage 24 into which the restricting oil passage 23 opens. The oil passage 24 is formed so as to extend perpendicularly to and to open in the flat back surface of the block of the hydraulic tensioning device 15 in contact with the end wall 2a of the cylinder block 2. A reservoir chamber 25 is formed in a mounting surface of the end wall 2a of the cylinder block 2 on which the hydraulic tensioning device 15 is mounted. When the hydraulic tensioning device 15 is attached to the end wall 2a of the cylinder block 2 so as to cover the expanded open end 16a of the main gallery 16, the oil passage 24 is able to communicate with the oil passage 42b of the semicylindrical part 42 by means of the reservoir chamber 25. Although shown in two separate sections in FIG. 9, the reservoir chamber 25 is a single straight chamber as shown in FIG. 2.

The lubricating oil pumped into the main gallery 16 by an oil pump, not shown, flows from the distribution chamber 17 consisting of the expanded open end 16a and the recess 21 into the oil passage 22, flows further from the oil passage 22 through the restricting oil passage 23, the oil passage 24 and the reservoir chamber 25 into the oil passage 42b. The variation of the pressure in the distribution chamber 17 is attenuated by the restricting function of the restricting oil passage 23 and the pressure accumulating function of the reservoir chamber 25, so that the pressure of the oil in the oil passage 42b varies gradually and the lubricating oil of a regulated pressure is supplied to through the oil passage 42b to the actuating unit 40.

As best shown in FIGS. 3 and 5, the hydraulic tensioning device 15 is provided in its upper half block 20 with two bolt holes 26 and 27 and in its lower half block 30 with one bolt hole 31 in a triangular arrangement. Bolts, not shown, are screwed through the bolt holes 26, 27 and 31 in threaded holes formed in the end wall 2a of the cylinder block 2 to fasten the hydraulic tensioning device 15 to the end wall 2a of the cylinder block 2. As shown in FIG. 3, the hydraulic tensioning device 15 is provided with two ribs 28 and 29 extended between the rim of the bolt hole 26 of the upper half block 20 to two parts of the actuating unit 40 of the lower half block 30 to enhance the structural strength of the hydraulic tensioning device 15.

The hydraulic tensioner in the first embodiment has the following effects.

The hydraulic tensioning device 15 is disposed in the timing mechanism chamber 4 so as to cover the expanded open end 16a of the main gallery 16. Therefore, any plug for closing the expanded open end 16a is not necessary, the number of parts can be reduced, and a part of the end wall 2a of the cylinder block 2 in which the expanded open end 16a is formed need not be tapped.

Since the oil passages 22, 23, 24 and 42b of the hydraulic tensioning device 15 and the reservoir chamber 25 are connected through the distribution chamber 17 to the main gallery 16, the lubricating oil can be supplied from the oil pump to the hydraulic tensioning device 15 through a short distance, the oil passages can easily be formed, the pressure of the lubricating oil supplied as a working fluid to the hydraulic tensioning device 15 rises quickly immediately after the internal engine has been started and hence the hydraulic tensioning device 15 is able to operate in a satisfactory response characteristic. Consequently, the vibration of the timing chain 9 due to the slack state of the timing chain 9 immediately after the start of the internal combustion engine 1, and the resultant noise generation can be avoided.

Since the hydraulic tensioning device 15 is provided with the restricting oil passage 23 for pressure regulation, difficult work for forming a restricting oil passage in the oil passages between the oil pump and the hydraulic tensioning device 15 is unnecessary. The cooperative effect of the restricting function of the restricting oil passage 23 and the pressure accumulating function of the reservoir chamber 25 enables the supply of the lubricating oil (working fluid) of a regulated pressure to the actuating unit 40 of the hydraulic tensioning device 15. Consequently, excessive tensioning of the timing chain 9 can be avoided and the timing chain 9 is able to turn smoothly for power transmission.

Second Embodiment

A hydraulic tensioner in a second embodiment according to the present invention will be described hereinafter with reference to FIG. 10, in which parts like or corresponding to those of the hydraulic tensioner in the first embodiment are designated by the same reference characters and the description thereof will be omitted.

An internal combustion engine 50 to which the hydraulic tensioner in the second embodiment is applied is provided with two camshafts. Two driven sprockets 8 are fixedly mounted on the two camshafts, respectively, a drive sprocket 6 is fixedly mounted on a crankshaft 5, and a timing chain 9 is wound around the two driven sprockets 8 and the drive sprocket 6.

Figure 10:
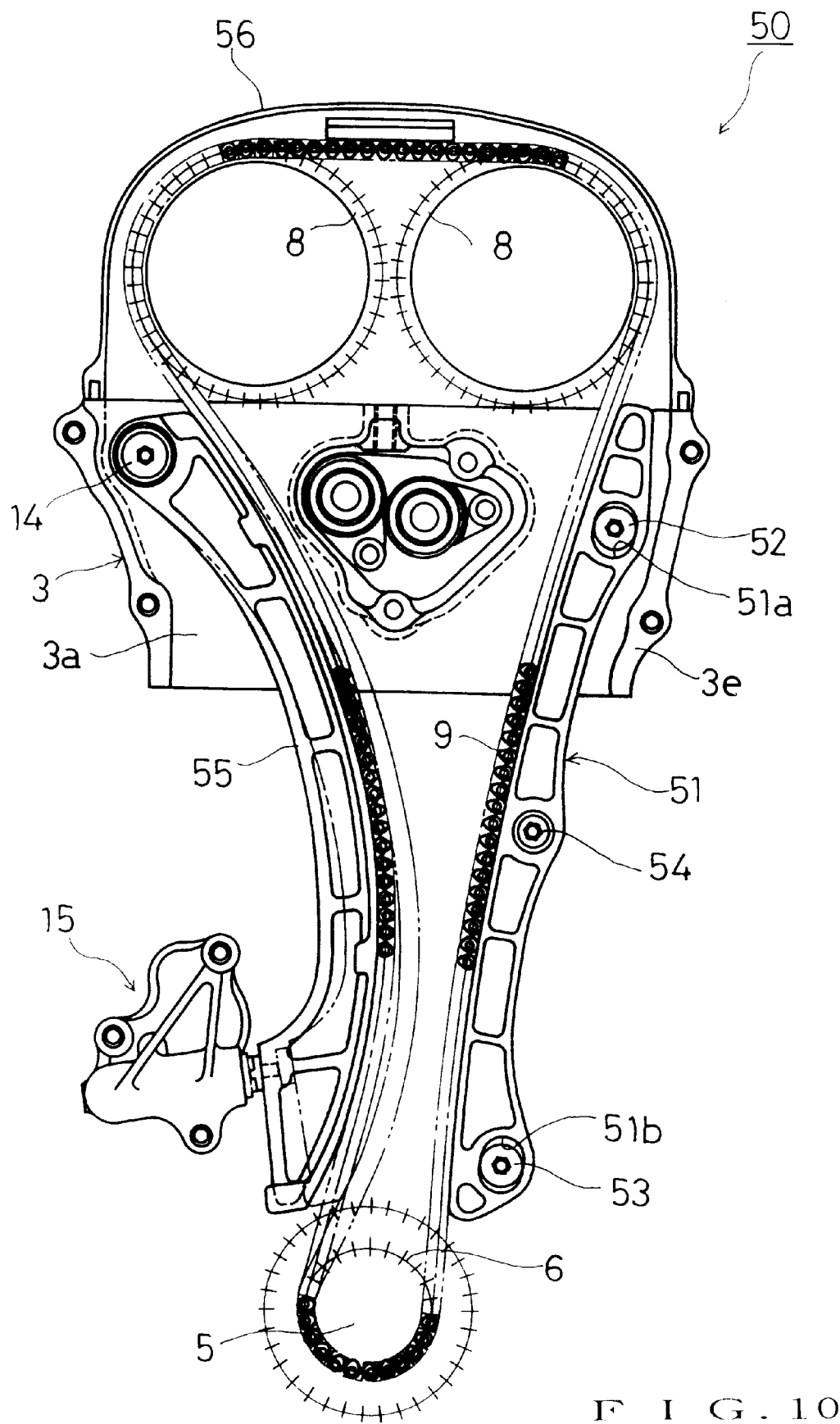
FIG. 10 is a schematic side elevation of an internal combustion engine provided with a hydraulic tensioner in a second embodiment according to the present invention, with a timing mechanism cover removed.

A tight side of the timing chain 9, i.e., a right-hand side as viewed in FIG. 10, pulled taut by the drive sprocket 6 is guided by a guide member 51 made of a resin. A shoe 55 made of a resin is pressed against a loose side of the timing chain 9, i.e., a left-hand side as viewed in FIG. 10, pulled by the driven sprocket 8 to tension the timing chain 9 properly so that the loose side of the timing chain 9 may not vibrate and may not generate noise.

Since the two driven sprockets 8 are disposed side by side, the loose side and the tight side of the timing chain 9, particularly the loose side of the timing chain 9 is curved convexly inward in a large curvature. Therefore, the guide surface of the shoe 55 is curved convexly toward the loose side of the timing chain 9 in a large curvature larger than that of the guide surface of the shoe 11 employed in the first embodiment. In FIG. 10 indicated at 56 is a cylinder head cover.

The guide member 51 employed in the second embodiment is longer than the guide member 10 employed in the first embodiment. The elongate guide member 51 has an upper end part fastened with an upper bolt 52 to the end wall 3a of a cylinder head 3, a lower end part fastened with a lower bolt 53 to the end wall of a cylinder block, not shown, and a middle part fastened with a middle bolt 54 to the end wall of the cylinder block. The upper end part and the lower end part of the guide member 51 are provided with elongate bolt holes 51a and 51b, respectively, to enable the upper and the lower end part of the guide member 51 to move relative to the bolts 52 and 53 when the guide member 51 is heated for thermal expansion or cooled for thermal contraction.

The hydraulic tensioner in the second embodiment has the following effects.

Since the elongate guide member 51 has the upper end part fastened to the cylinder head, and the middle and the lower end part fastened to the cylinder block, the apparent span between the fixed parts is short and hence the guide member 51 can be held in a rigid state.

Since the upper and the lower end part of the guide member 51 are provided with the elongate bolt holes 51a and 51b, respectively, the upper and the lower end part of the guide member 51 are able to move away or toward the fixed middle part according to the thermal expansion or thermal contraction of the guide member 51. Consequently, the warping of the guide surface of the guide member 51 can be prevented and the unsatisfactory timing chain guiding performance of the guide member 51 can be prevented. Since the guide member 51 has the fixed middle part, the warping of the guide surface of the guide member 51 is less than that of the guide member 10 employed in the first embodiment, which further effectively prevents the unsatisfactory timing chain guiding performance of the guide member 51.

Third Embodiment

A timing mechanism cover structure in a third embodiment according to the present invention will be described with reference to FIGS. 11 to 17, in which parts like or corresponding to those of the first embodiment are designated by the same reference characters and the description thereof will be omitted.

Figure 11:
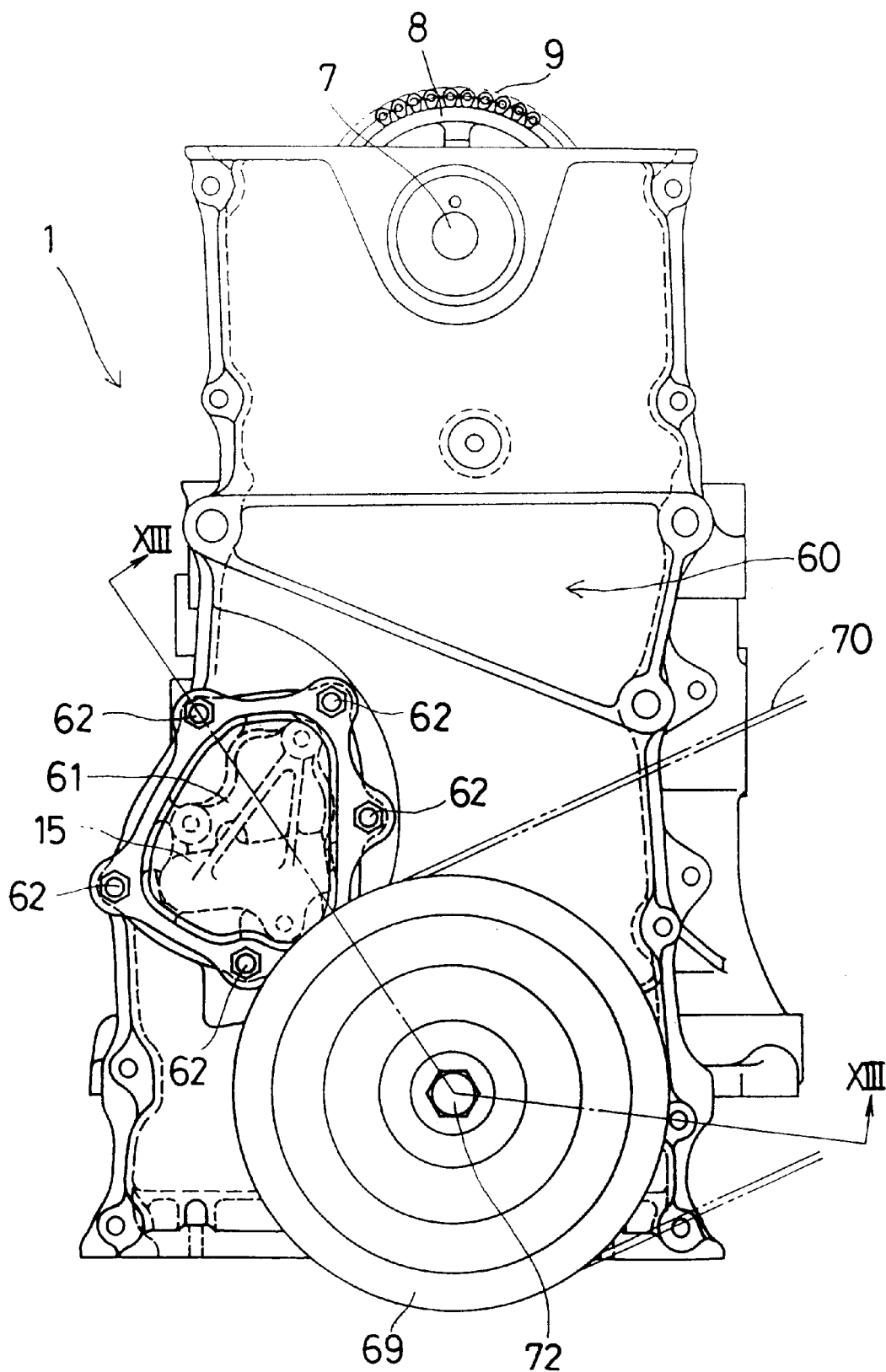
FIG. 11 is a schematic side elevation of an internal combustion engine provided with a timing mechanism cover structure in a third embodiment according to the present invention, with a crankcase and a cylinder head cover removed.

The timing mechanism cover structure in the third embodiment is applied to a single-overhead-camshaft (SOHC) type internal combustion engine 1. FIG. 11 is a schematic side elevation of the internal combustion engine 1 with a crankcase and a cylinder head cover removed, and FIG. 12 is a schematic side elevation of the internal combustion engine 1 with a crankshaft pulley 69 and a timing mechanism cover 60 removed.

Referring to FIG. 12, the end wall 2a of a cylinder block 2 has opposite peripheral ribs 2e rising from the surface of opposite sides of the end wall 2a in a small height and having joint surfaces 2b. The end wall 3a of a cylinder head 3 has opposite peripheral ribs 3e rising from the surface of the opposite sides of the end wall 3a in a small height and having joint surfaces 3b. The joint surfaces 2b and 3b serve as mounting surfaces on which the timing mechanism cover 60 is mounted. A plurality of portions of the peripheral ribs 2e and 3e are expanded to form expanded parts 2d and 3d, and threaded holes 2c and 3c are formed in the expanded parts 2d and 3d, respectively.

A crankshaft 5 is journaled on the cylinder block 2 and the crankcase, not shown, and a crankshaft sprocket 6 is keyed to the crankshaft 5. A camshaft 7 is journaled on the cylinder head 3 and a camshaft sprocket 8 is keyed to the camshaft 7. A timing chain 9 is extended between the crankshaft sprocket 6 and the camshaft sprocket 8. The timing chain 9 is a silent chain.

An elongate timing chain guide 10 is disposed so as to extend along a tight side of the timing chain 9 on the right-hand side, as viewed in FIG. 12. The timing chain guide 10 has an upper end part fastened to the end wall 3a of the cylinder head 3 with a bolt 12, and a lower end part fastened to the end wall 2a of the cylinder block with a bolt 22. An elongate shoe 11 is disposed so as to exert pressure on a loose side of the timing chain 9 on the left-hand side, as viewed in FIG. 12. The elongate shoe 11 has an upper end part pivotally supported by a pivot pin 14 on the end wall 3a of the cylinder head 3 and a lower end part connected to a hydraulic tensioning device 15. The hydraulic tensioning device 15 has a plunger 41 which pushes the shoe 11 toward the loose side of the timing chain 9 to tension the loose side of the timing chain 9 properly. The hydraulic tensioning device 15 is disposed at a position near the crankshaft 5 on the cylinder block 2. The plunger 41 of the hydraulic tensioning device 15 is projected toward the shoe 11 to push a lower part of the shoe 11. The hydraulic tensioning device 15 is fastened to the end wall 2a of the cylinder block 2 with three bolts 63.

Figure 14:
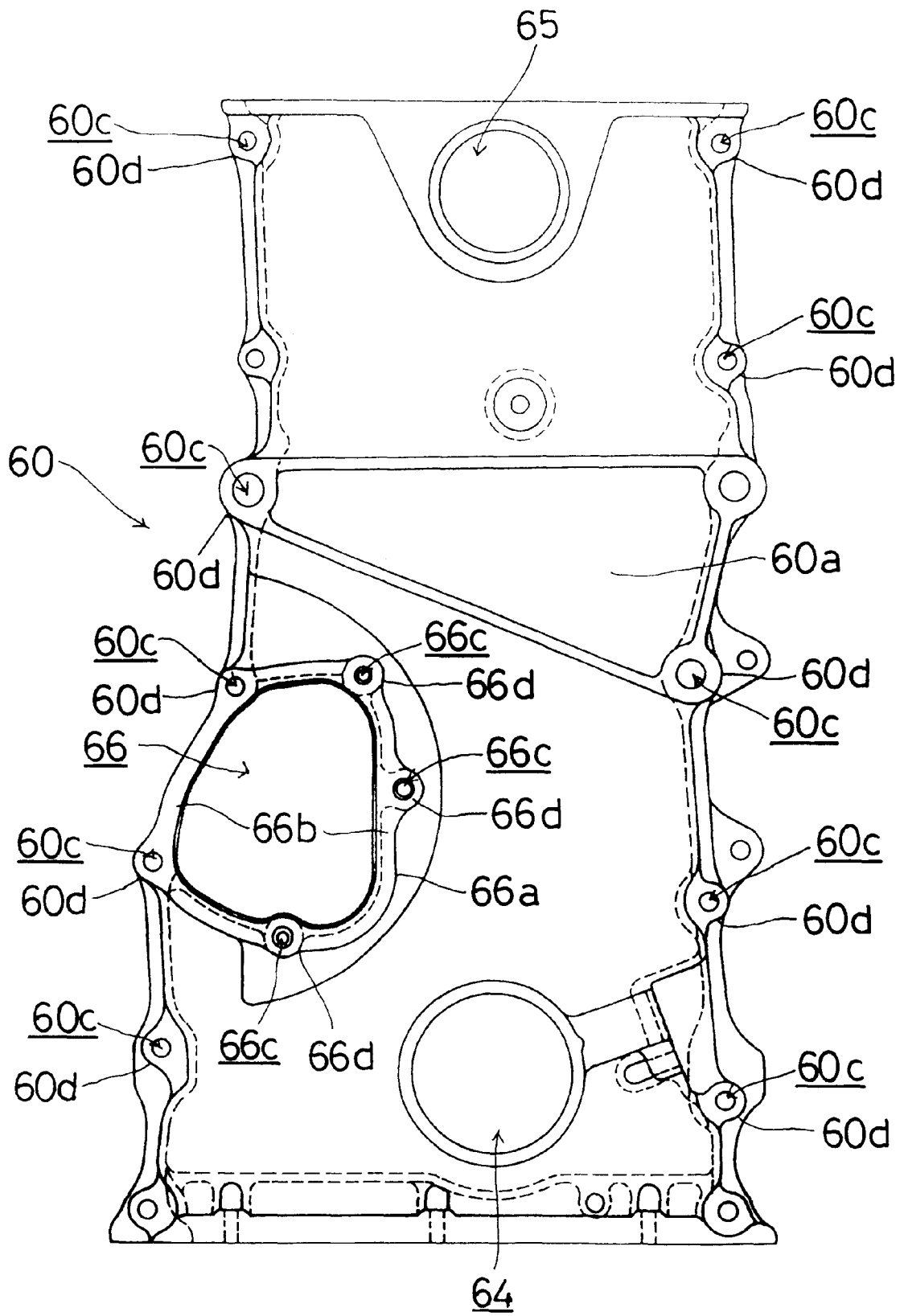
FIG. 14 is a front elevation of a timing mechanism cover included in the timing cover structure shown in FIG. 11.

A timing mechanism thus constructed in a timing mechanism chamber 4 defined by the cylinder block 2, the cylinder head 3 and the timing mechanism cover 60 and is covered with the timing mechanism cover 60. As shown in FIGS. 14 and 15, the timing mechanism cover 60 has a main wall 60a, and side walls surrounding the main wall 60a and having a flange having a joint surface 60b. Portions of the side walls are expanded to form expanded parts 60d, and bolt holes 60c are formed at positions corresponding to the expanded parts 60d in the joint surface 60b. A circular opening 64 for the crankshaft 5 is formed in a middle region of a lower part of the main wall 60a, and a circular opening 65 for the camshaft 7 is formed in a middle region of an upper part of the main wall 60a. A large handhole 66 of a predetermined shape is formed along the joint surface 60b in a region of the main wall 60a corresponding to the hydraulic tensioning device 15. The rim 66a of the handhole 66 has a joint surface 66b. Three portions of the rim 66a are expanded to form three expanded parts 66d and bolt holes 60c are formed in the expanded parts 66d. The surface of a part of the rim 66a forms a part of the joint surface 60b of the main wall 60a, and the two of the bolt holes 60c are formed in the same part of the rim 66a.

As shown in FIG. 15, ribs 67 are formed in a complicated pattern on the inner surface of the main wall 60a. Most of the ribs 67 are formed so as to connect the respective rims 64a, 65a and 66a of the circular openings 64 and 65 and the handhole 66, and the expanded parts 60d provided with the bolt holes 60c. Particularly, the expanded parts 66d of the rim 66a of the handhole 66 are connected by ribs 68 to the expanded parts 60d of the side walls. Since the timing mechanism cover 60 has the main wall 60a provided on its inner surface with the plurality ribs 67, and the ribs 68 connecting the expanded parts 66d of the rim 66a of the handhole 66 to the expanded parts 60d, the timing mechanism cover 60 has a high rigidity and the vibrations and noise generation of the main wall 60a of the timing mechanism cover 60 can be suppressed.

Figure 13:
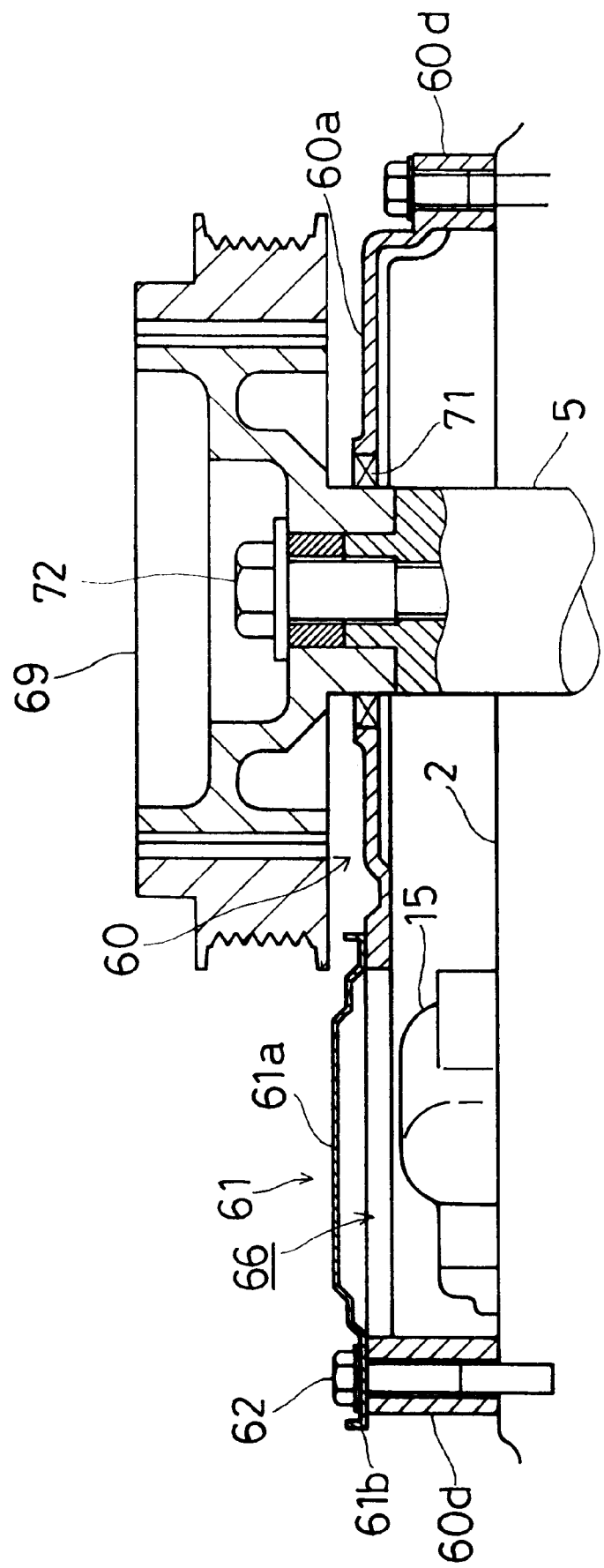
FIG. 13 is a sectional view taken on line XIII—XIII in FIG. 11.

The timing mechanism cover 60 thus formed is put on the end walls of the cylinder block 2 and the cylinder head 3 to cover the timing mechanism formed in the timing mechanism chamber 4. An end part of the crankshaft 5 projects through the circular opening 64 of the timing mechanism cover 60, and the crankshaft pulley is keyed to the end part of the crankshaft 5 and is fixedly held in place by a collar bolt 72 (FIG. 13). A belt 70 is wound around the crankshaft pulley 69 to transmit power to accessories including a generator, a compressor included in an air conditioning system and an oil pump included in a power steering system.

Figure 16:
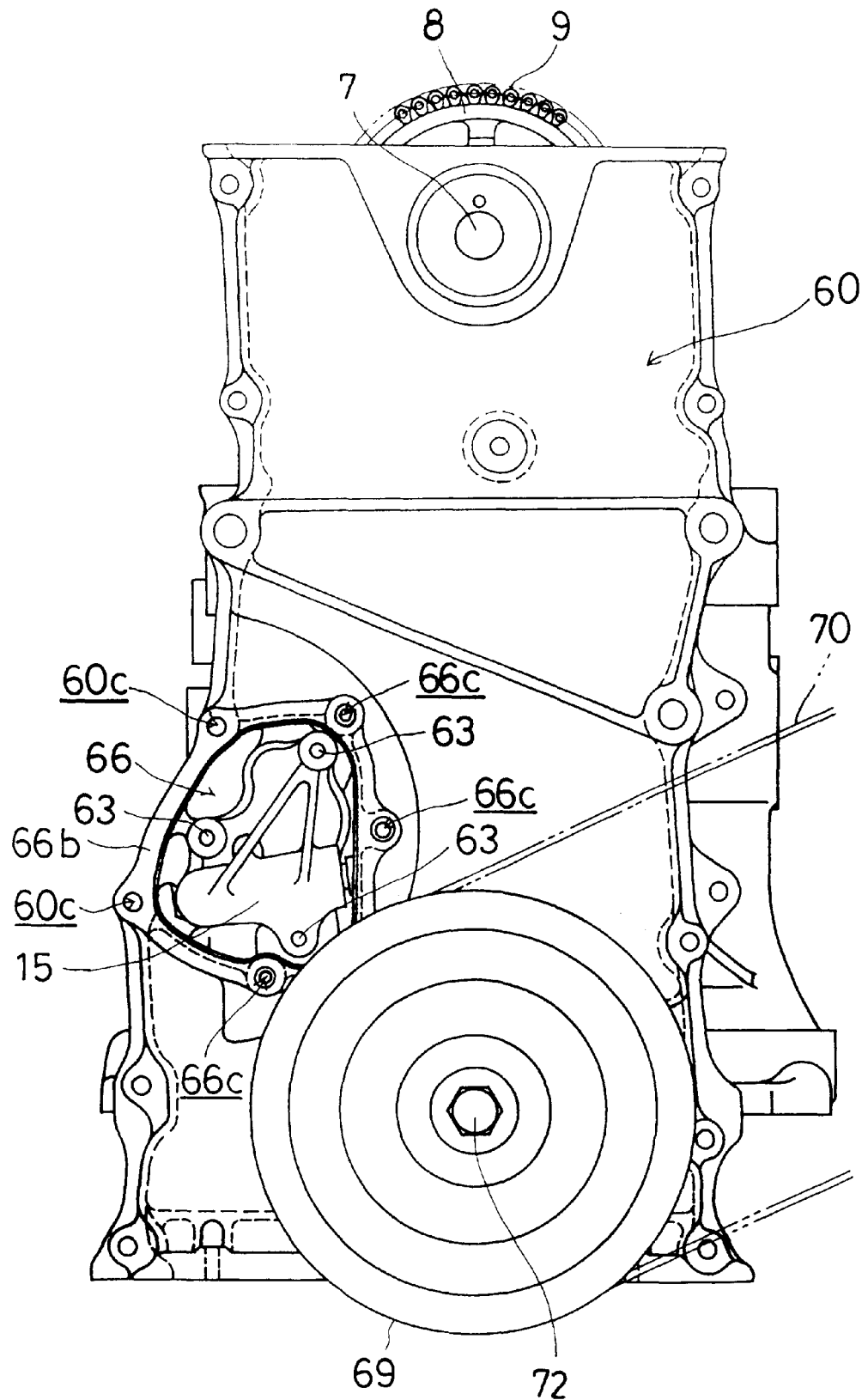
FIG. 16 is a side elevation of the timing mechanism covering structure shown in FIG. 11 with a covering member removed.
Figure 17:
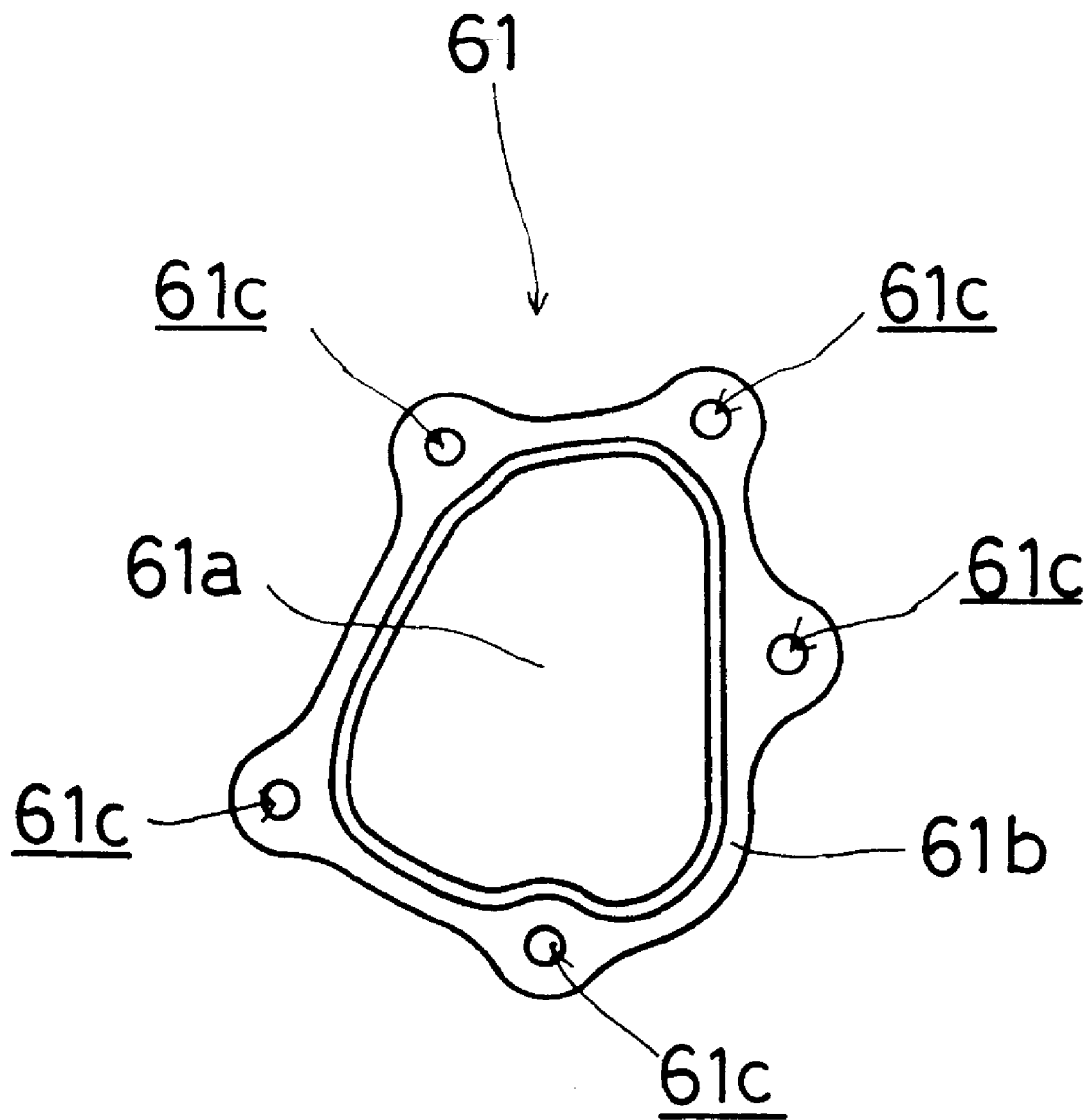
FIG. 17 is a plan view of the covering member included in the timing mechanism covering structure of FIG. 11.

As shown in FIG. 13, a gap between the rim 64a of the circular opening 64, and the crankshaft 5 or the crankshaft pulley 69 is sealed by a sealing member 71. A gap between the rim 65a of the circular opening 65 and the camshaft 7 is sealed by a sealing member, not shown. As shown in FIG. 16, the handhole 66 of the timing mechanism cover 60 fronts on the hydraulic tensioning device 15. The hydraulic tensioning device 15 is exposed entirely in the handhole 66, and the three bolts 63 fastening the hydraulic tensioning device 15 to the cylinder block 2 can be reached through the handhole 66 to fasten or unfasten the bolts 63. The hydraulic tensioning device 15 can be taken out through the handhole 66 from the timing mechanism chamber after removing the bolts 63 fastening the hydraulic tensioning device 15 to the cylinder block 2, and the hydraulic tensioning device 15 can be put in the timing mechanism chamber through the handhole 66 and can be attached to the cylinder block 2. Thus, the maintenance and replacement of the hydraulic tensioning device 15 can be achieved by inserting hands through the handhole 66 without removing the timing mechanism cover 60. Since the hydraulic tensioning device 15 lies inside a plane including the joint surface 66b of the rim 66a, the handhole 66 can be covered with a flat covering member 61. As shown in FIGS. 13 and 17, the covering member 61 is formed in a stepped shape and has a flat central part 61a, and a peripheral part 61b of a shape substantially corresponding to that of the joint surface 66b of the rim 66a of the handhole 66. The peripheral part 61b is provided with five bolt holes 61c respectively corresponding to the three threaded holes 66c of the joint surface 66b and the two bolt holes 60c. As shown in FIG. 16, the three threaded holes 66c and the two bolt holes 60c formed in the joint surface 66b of the rim 66a of the handhole 66 of the timing mechanism cover 60 formed at positions not concealed behind the crankshaft pulley 69 and the belt 70. Therefore, the covering member 61 can be fastened to the timing mechanism cover 60 with bolts 62 so as to cover the handhole 66 and can be removed from the timing mechanism cover 60 by removing the bolts 62 without removing the crankshaft pulley 69 from the crankshaft 5.

Maintenance work for the maintenance of the hydraulic tensioning device 15 can be carried out by removing the covering member 61 and inserting hands through the handhole 66 without requiring troublesome work for removing the belt 70 and the crankshaft pulley 69. If necessary, the hydraulic tensioning device 15 can be detached from the cylinder block 2 and can be taken out through the handhole 66 to facilitate the maintenance of the hydraulic tensioning device 15. Similarly, the hydraulic tensioning device 15 can easily be replaced with another one. The timing chain 9 can be slackened and disengaged from the camshaft sprocket 8 by operating or taking out the hydraulic tensioning device 15 through the handhole 66 to remove pressure exerted on the shoe 11. Since the timing chain 9 can thus be disengaged from the camshaft sprocket 8 without removing the timing mechanism cover 60, the maintenance of the timing mechanism can easily be achieved.

The covering member 61 is fastened to the joint surface 66b of the timing mechanism cover 60 with the five bolts 62 so as to cover the handhole 66. The two bolts 62 among the five bolts 62 are inserted through the bolt holes 61c of the covering member 61 and the bolt holes 60c of the timing mechanism cover 60 and are screwed in the threaded holes 2c of the cylinder block 2 to fasten the covering member 61 firmly to the joint surface 66b. A portion of the covering member 61 provided with the bolt holes 61c are fastened together with a corresponding portion of the timing mechanism cover 60 to the cylinder block 2. Therefore, part of the covering member 61 is fastened firmly to the highly rigid cylinder block 2 with a reduced number of bolts, which reduces the weight and the cost.

The hydraulic tensioning device 15 is disposed at a position near the crankshaft 5 on the cylinder block 2. Generally, the cylinder block is formed so that the width of a part thereof on the side of the crankshaft 5 is greater than that of a part thereof on the side of the camshaft 7 to secure a space for the rotation of the crankshaft. Therefore, any additional space for placing the hydraulic tensioning device 15 is not necessary, the shape of the hydraulic tensioning device 15 need not be changed, and the hydraulic tensioning device can be disposed in a compact arrangement.

Although the timing mechanism associated with the third embodiment is a chain drive mechanism including the timing chain 9, the timing mechanism may be a belt drive mechanism including a timing belt. The term, "wrapping connecting" is the general designation of chains and timing belts. The crankshaft pulley 69 may be substituted by a sprocket and the accessories may be driven by a chain. The timing chain 9 associated with the third embodiment need not be limited to the silent chain, but may be a roller chain or the like.

Fourth Embodiment

A timing mechanism covering structure in a fourth embodiment according to the present invention will be described with reference to FIGS. 18 to 23, in which parts like or corresponding to those of the third embodiment are designated by the same reference characters and the description thereof will be omitted.

Figure 18:
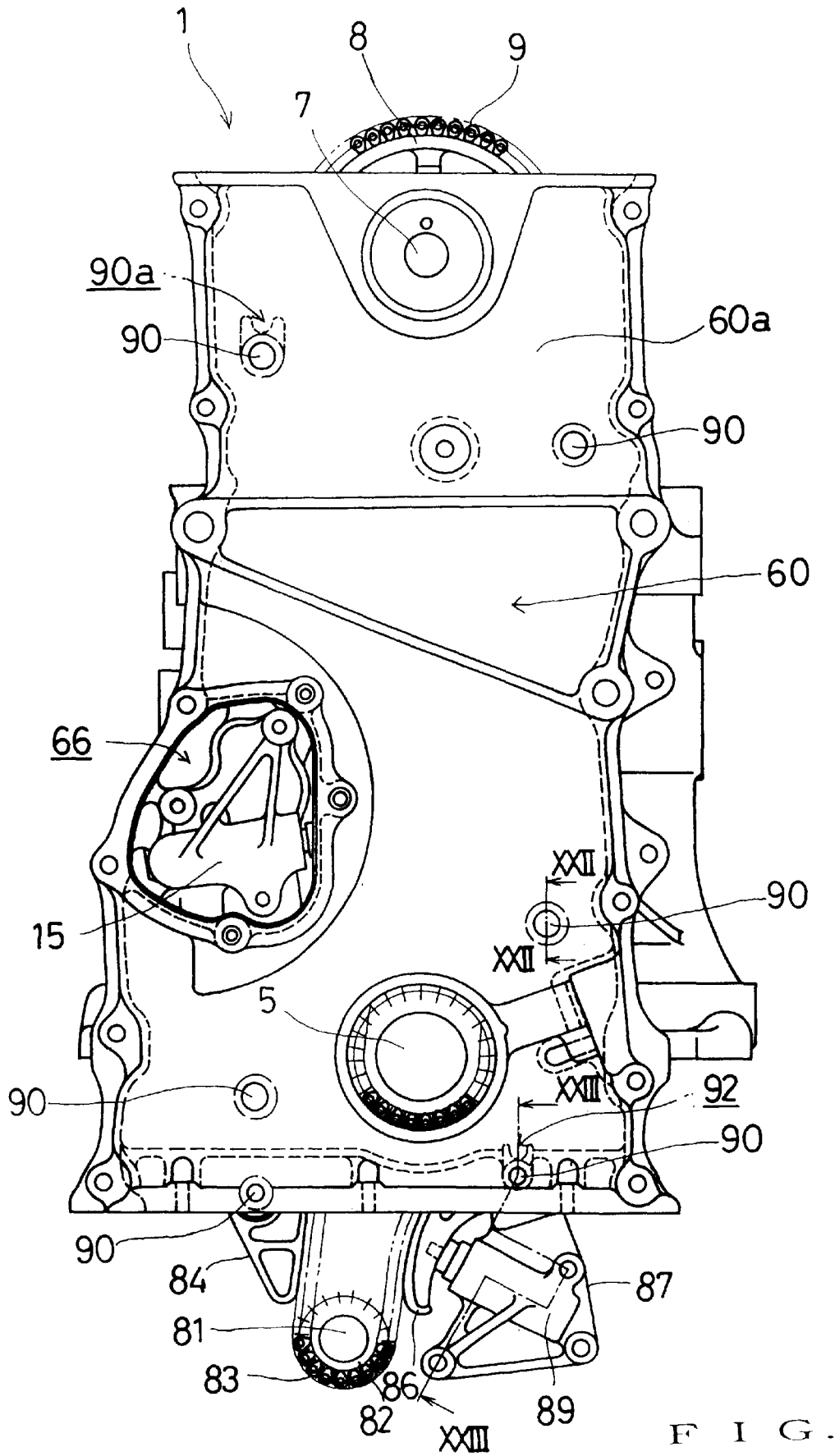
FIG. 18 is a side elevation of an internal combustion engine provided with a timing mechanism covering structure in a fourth embodiment according to the present invention with a crankcase and a cylinder head cover removed.

The timing mechanism covering structure in the fourth embodiment is applied to a single-overhead-camshaft (SOHC) type internal combustion engine 1. FIG. 18 is a schematic side elevation of the internal combustion engine 1 with a crankcase and a cylinder head cover removed, and FIG. 19 is a schematic side elevation of the internal combustion engine 1 with a timing mechanism cover 60 removed.

Referring to FIGS. 18 and 19, the end wall 2a of a cylinder block 2 has opposite peripheral ribs 2e rising from the surface of opposite sides of the end wall 2a and having joint surfaces 2b. The end wall 3a of a cylinder head 3 has opposite peripheral ribs 3e rising from the surface of the opposite sides of the end wall 3a and having joint surfaces 3b. The joint surfaces 2b and 3b serve as mounting surfaces on which the timing mechanism cover 60 is mounted. A plurality of portions of the peripheral ribs 2e and 3e are expanded to form expanded parts 2d and 3d, and threaded holes 2c and 3c are formed in the expanded parts 2d and 3d, respectively.

A crankshaft 5 is journaled on the cylinder block 2 and the crankcase, not shown, and a first crankshaft sprocket (camshaft driving sprocket) 6 and a second crankshaft sprocket (accessory driving sprocket) 80 are fixedly mounted on the crankshaft 5. A camshaft 7 is journaled on the cylinder head 3 and a camshaft sprocket (driven sprocket) 8 is fixedly mounted on the camshaft 7. A timing chain 9 is extended between the first crankshaft sprocket 6 and the camshaft sprocket 8. An oil pump, not shown, is disposed below the crankshaft 5, a pump sprocket 82 is fixedly mounted on the pump shaft 81 of the oil pump, and a pump driving chain 83 is extended between the second crankshaft sprocket 80 and the pump sprocket 82. The timing chain 9 and the pump driving chain 83 are silent chains.

An elongate timing chain guide 10 is disposed so as to extend along a tight side of the timing chain 9 on the right-hand side, as viewed in FIG. 19. An elongate shoe 11 is disposed so as to exert pressure on a loose side of the timing chain 9 on the left-hand side, as viewed in FIG. 19. The timing chain guide 10, the shoe 11 and a hydraulic tensioning device 15 are identical in arrangement and construction with those of the hydraulic tensioner associated with the third embodiment.

A chain guide 84 is disposed so as to extend along a tight side of the pump driving chain 83 on the left-had side, as viewed in FIG. 19 and is fastened to the crankcase with bolts 85. A shoe 86 is pivotally supported on arms 87a and 87b formed on a tensioner base 87 by a pivot pin 88 so as to exert pressure on a loose side of the pump driving chain 83 on the right-hand side, as viewed in FIG. 19. A hydraulic tensioning device 89 formed integrally with the tensioner base 87 presses the shoe 86 against the loose side of the pump driving chain 83 to tension the pump driving chain 83.

Figure 21:
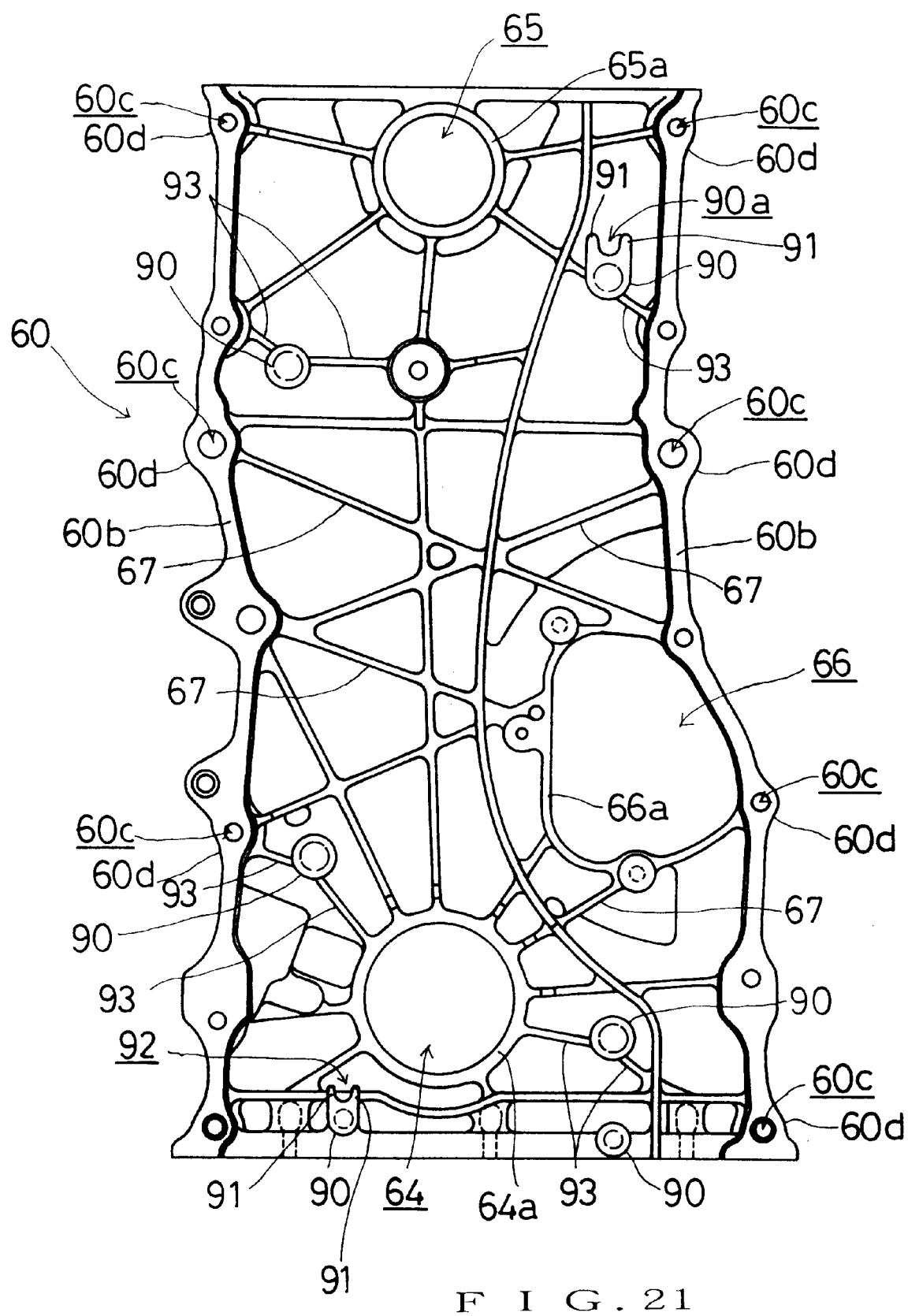
FIG. 21 is a rear elevation of the timing mechanism cover shown in FIG. 20.

A timing mechanism thus constructed in a timing mechanism chamber 4 defined by the cylinder block 2, the cylinder head 3 and the timing mechanism cover 60 is covered with the timing mechanism cover 60. As shown in FIGS. 20 and 21, the timing mechanism cover 60 has a main wall 60a, and side walls surrounding the main wall 60a and having a flange having a joint surface 60b. Portions of the side walls are expanded to form expanded parts 60d, and bolt holes 60c are formed at positions corresponding to the expanded parts 60d in the joint surface 60b. A circular opening 64 for the crankshaft 5 is formed in a middle region of a lower part of the main wall 60a, and a circular opening 65 for the camshaft 7 is formed in a middle region of an upper part of the main wall 60a. A large handhole 66 of a predetermined shape is formed along the joint surface 60b in a region of the main wall 60a corresponding to the hydraulic tensioning device 15. As shown in FIG. 21, ribs 67 are formed in a complicated pattern on the inner surface of the main wall 60a. Most of the ribs 67 are formed so as to connect the respective rims 64a, 65a and 66a of the circular openings 64 and 65 and the handhole 66, and the expanded parts 60d provided with bolt holes 60c.

The timing mechanism cover 60 is provided in its main wall 60a with six projections 90 projecting from the inner surface thereof and formed by sinking portions of the main wall 60a from the outer side toward the inner side thereof. When the timing mechanism cover 60 is set in place on the internal combustion engine, the projections 90 coincide, respectively, with the heads of the bolts 12 and 13 fastening the timing chain guide 10 to the cylinder head 3 and the cylinder block 2, the head of a pivot pin 14 pivotally supporting the shoe 11, the heads of the bolts 85 fastening the chain guide 84 to the crankcase, and the head of the pivot pin 88 pivotally supporting the shoe 86. The pivot pin 14 has a threaded part screwed in the end wall 3a of the cylinder head 3.

Figure 22:
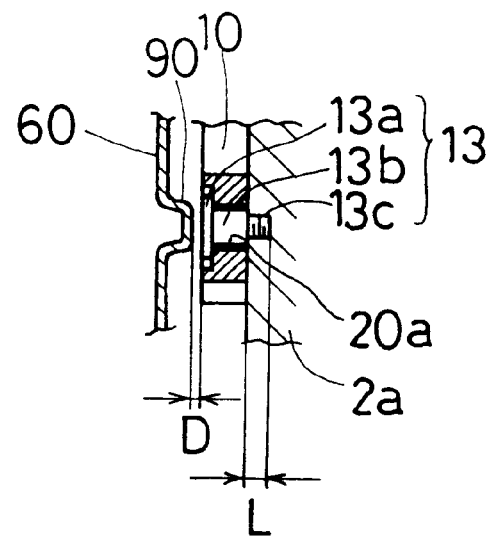
FIG. 22 is a sectional view taken on line XXII—XII in FIG. 18.

The timing mechanism cover 60 is set on the cylinder block 2 and the cylinder head 3 with the corresponding joint surfaces in contact with each other, and is fastened to the cylinder block 2 and the cylinder head 3 by screwing bolts through the bolt holes 60c in the threaded holes 2c and 3c. In this state, the extremities of the projections 90 are close to the heads of the bolts 12, 13 and 85 and the pivot pins 14 and 88. FIG. 22 is a sectional view taken on line XXII—XXII in FIG. 18 and showing a region around the bolt 13 fastening the lower part of the timing chain guide 10 to the cylinder block 2. As shown in FIG. 22, the bolt 13 has a cylindrical body 13b, a flange 13a formed on one end of the body 13b, and a threaded part 13c formed on the other end of the body 13b. The threaded part 13c of the bolt 13 is screwed in a threaded hole formed in the end wall 2a of the cylinder block 2 with the body 13b fitted in a hole 20a formed in the timing chain guide 10 and the flange 13a received in a counterbore formed in the rim of the hole 20a. In this state, the end surface of the flange 13a of the bolt 13 is substantially flush with the outer side surface of the timing chain guide 10. The distance D between the end surface of the flange 13a and the extremity of the corresponding projection 90 is shorter than the length L of a portion of the threaded part 13c screwed in the threaded hole formed in the end wall 2a of the cylinder block 2. Accordingly, the bolt 13 is unable to come out even if the same loosens because the axial movement of the bolt 13 away from the cylinder block 2 is limited by the projection 90 before the bolt 13 comes out. Thus, the falling of the bolt 13 off the cylinder block 2 and the resultant serious damage in the internal combustion engine can be prevented by a simple structure formed by providing the timing mechanism cover 60 with the projection 90. Similarly, the projections 90 corresponding to the bolts 85 prevents the bolts 85 from coming out. Sets each of a bolt and a nut may be used instead of the bolts 12, 13 and 85.

Figure 23:
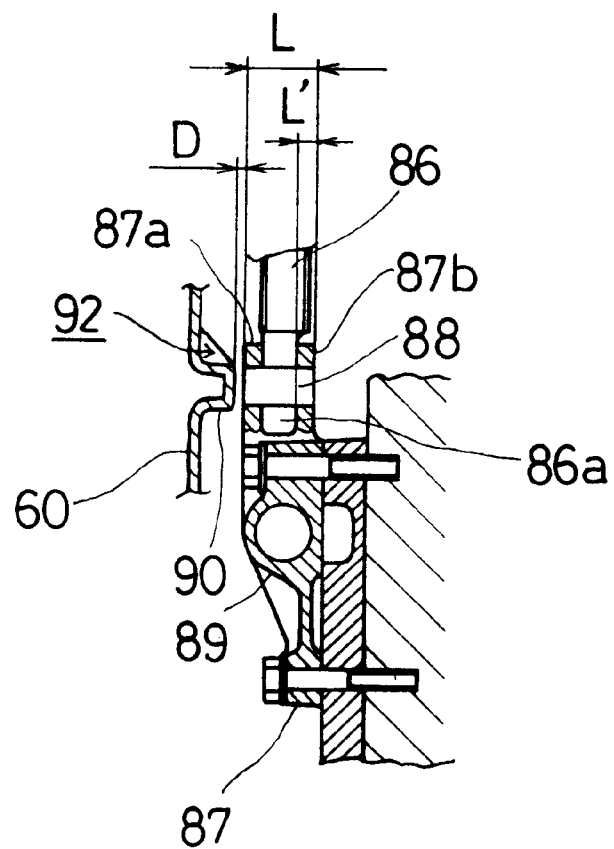
FIG. 23 is a sectional view taken on line XXIII—XXIII in FIG. 18.
Figure 24:
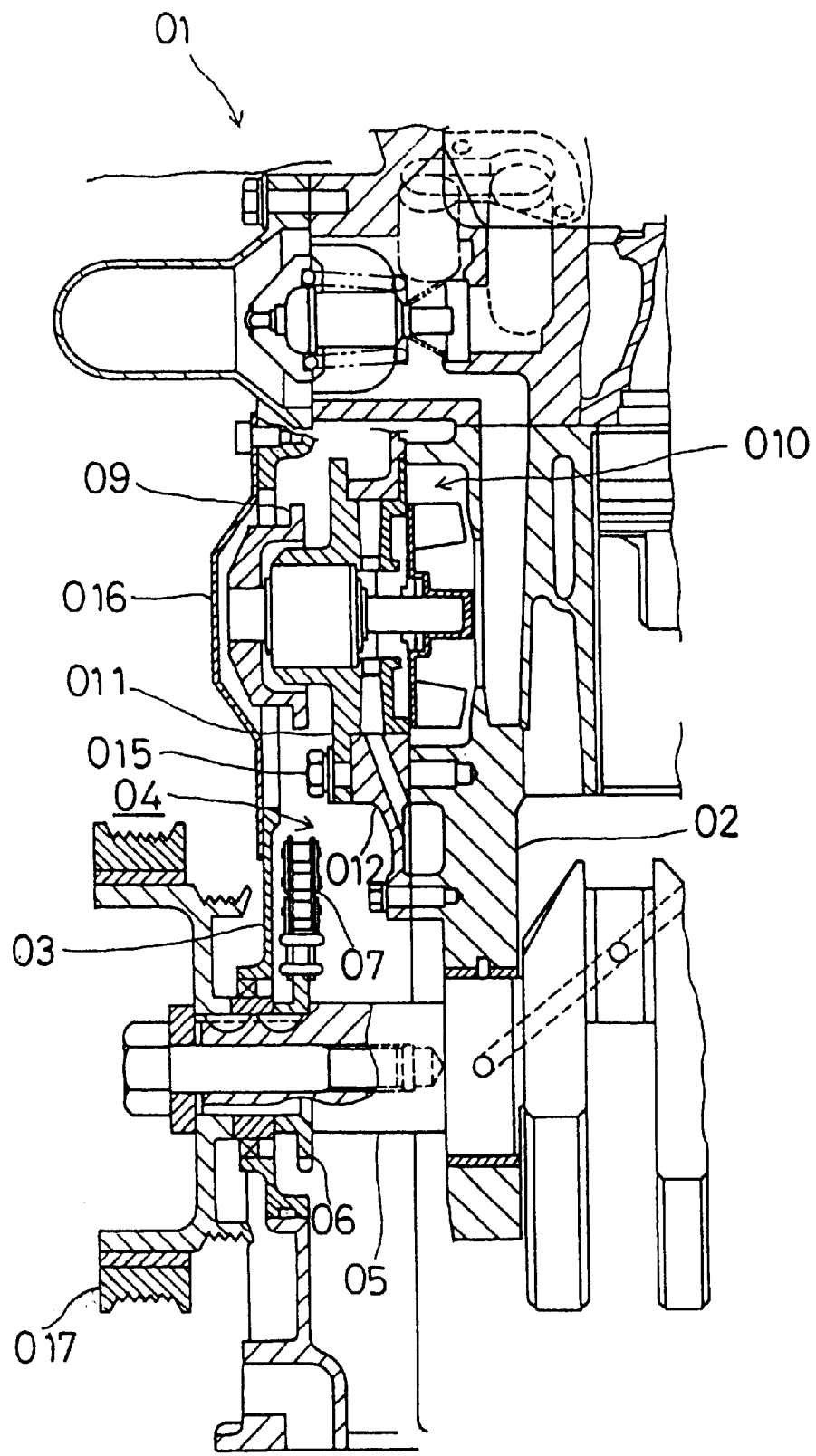
FIG. 24 is a sectional view of an essential part of an internal combustion engine provided with a conventional timing mechanism covering structure.

FIG. 23 is a sectional view taken on line XXIII—XXIII in FIG. 18 and showing a region around the pivot pin 88. Referring to FIG. 23, a base part 86a of the shoe 86 is fitted in a space between the arms 87a and 87b of the tensioner base 87, and opposite end parts of the pivot pin 88 penetrating the base part 86a of the shoe 86 are forced into holes formed in the arms 87a and 87b to support the shoe 86 pivotally on the tensioner base 87. In this state, the opposite end surfaces of the pivot pin 88 are substantially flush with the outer side surfaces of the arms 87a and 87b, respectively. The extremity of the projection 90 corresponding to the pivot pin 88 is close to the pivot pin 88. The distance D between the extremity of the projection 90 and the outer end of the pivot pin 88 is shorter than the length L' of a part of the pivot pin 88 fitted in the hole of the arm 87b, i.e., the thickness of the arm 87b. Accordingly, the pivot pin 88 is unable to come out of the arm 87b because the axial movement of the pivot pin 88 away from the arm 87b is limited by the projection 90 before the pivot pin 88 comes out of the arm 87b. Thus, the shoe 86 can surely be supported for turning. Opposite walls 91 extend upward from the projection 90 so as to define a recess 92 opening upward and toward the pivot pin 88 as shown in FIGS. 21 and 23. The level of the recess 92 is above that of the pivot pin 88. The lubricating oil scattered in the timing mechanism chamber 4 accumulates in the recess 92 and flows from the recess 92 onto the pivot pin 88 to lubricate the sliding surfaces of the pivot pin 88 and the base part 86a of the shoe 86 to ensure the smooth turning motion of the shoe 86. Similarly, the extremity of the projection 90 corresponding to the pivot shaft 14 pivotally supporting the shoe 11 is close to the pivot shaft 14. The distance D between the extremity of the projection 90 and the outer end of the pivot shaft 14 is shorter than the length the treaded part of the pivot shaft 14 screwed in the end wall 3a of the cylinder head 3. Accordingly, the pivot shaft 14 is unable to come out of the end wall 3a of the cylinder head 3 because the axial movement of the pivot shaft 14 away from the end wall 3a of the cylinder head 3 is limited by the projection 90 before the pivot shaft 14 comes out of the end wall 3a of the cylinder head 3. A recess 90a is formed on the projection 90. The lubricating oil collected in the recess 90a drips onto the pivot shaft 14 to lubricate the sliding surfaces of the pivot shaft 14 and the shoe 11 to ensure the smooth turning motion of the shoe 11.

As is obvious from FIG. 21, the projections 90 projecting from the inner surface of the timing mechanism cover 60 are connected to the expanded parts 60d provided with the bolt holes 60c and the respective rims 64a and 65a of the circular openings 64 and 65 by ribs 93. The connection of the rigid projections 90, the expanded parts 60d, the rims 64a and 65a, and the ribs 93 enhances the rigidity of the timing mechanism cover 60 and prevents the vibration and noise generation of the timing mechanism cover 60. In the fourth embodiment, the projections 90 are formed so as to project from the inner surface of the main wall 60a by sinking portions of the main wall 60a from the outer side toward the inner side thereof, and recesses are formed in the outer surface of the main wall 60a. The recesses may be filled up to finish the outer surface of the main wall 60a in a smooth surface.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. An internal combustion engine having a cylinder block, a crankshaft and a camshaft for driving suction and exhaust valves, and a timing mechanism for transmitting a rotation of the crankshaft to the camshaft, comprising:
    a timing mechanism cover attached to said cylinder block to define a timing mechanism chamber between the timing mechanism cover and the cylinder block;
    said timing mechanism being provided in said timing mechanism chamber and including a wrapping connecting member and a tensioner for tensioning the wrapping connecting member, said tensioner including a shoe held in contact with the wrapping connecting member, and a tensioning device for biasing the shoe toward the wrapping connecting member;
    said timing mechanism cover having a handhole formed at a position corresponding to said tensioning device;
    a covering member having a peripheral part attached to said timing mechanism cover to close said handhole; and
    fastening bolts passed through said peripheral part of the covering member into said timing mechanism cover to fasten the covering member to the timing mechanism cover, at least some of said fastening bolts passing through said timing mechanism cover into said cylinder block to fasten together the covering member and the timing mechanism cover to the cylinder block.

2. The internal combustion engine according to claim 1, wherein said crankshaft has an end part penetrating and projecting out from the timing mechanism cover, a crankshaft wheel is mounted on the end part of the crankshaft, and an accessory driving chain or belt is passed around said crankshaft wheel, said peripheral part of the covering member and said fastening bolts being positioned to be not concealed behind the crankshaft wheel and the accessory driving chain or belt.

3. The internal combustion engine according to claim 1, wherein said shoe is pivoted at a position adjacent said camshaft and said tensioning device is disposed adjacent said crankshaft.

4. The internal combustion engine according to claim 1, wherein said some of the fastening bolts are a plurality of fastening bolts.

5. The internal combustion engine according to claim 1, wherein said timing mechanism cover is formed with a side wall which is partly formed with an outwardly bulging wall portion and said tensioning device is positioned inside of said bulging wall portion.

6. The internal combustion engine according to claim 1, wherein said timing mechanism cover is formed with side walls having expanded parts at which the covering member is fastened with the fastening bolts, and the expanded parts are connected by ribs to peripheral rims of said handhole.

7. The internal combustion engine according to claim 6, wherein said timing mechanism cover is formed with an opening for passing said crankshaft therethrough and another opening for passing said camshaft therethrough, said openings being defined by peripheral rims, respectively, said expanded parts being connected by ribs to said peripheral rims of the openings.

8. An internal combustion engine according to claim 1, wherein said timing mechanism covering comprises:
    a main wall;
    side walls along the periphery of the covering surrounding the main wall;
    a first rim formed around an opening for accommodating the crankshaft;
    a second rim formed around an opening for accommodating the camshaft;
    a third rim formed around the handhole formed in a region corresponding to a location of the tensioner,
    whereby the timing mechanism cover has a high rigity and suppresses vibrations and noise generation of the main wall.

9. An internal combustion engine according to claim 1, wherein said timing mechanism comprises:
    a main wall;
    side walls along the periphery of the covering surrounding the main wall,
    a first rim formed around an opening for accommodating the crankshaft;
    a second rim formed around an opening for accommodating the camshaft;
    a third rim formed around the handhole formed in a region corresponding to a location of the tensioner, and
    an inner surface facing the internal combustion engine further comprising,
        a first set of ribs connecting each of the rims together and each of the rims to expanded portions of the sidewalls,
        a second set of ribs connecting the third rim to the expanded portions of the side walls;
    whereby the timing mechanism cover has a high rigidity and suppresses vibrations and noise generation of the main wall.

* * * * *